(12) United States Patent
Jacobson et al.

(10) Patent No.: US 11,367,261 B2
(45) Date of Patent: Jun. 21, 2022

(54) PRESENTING AN AUGMENTED REALITY INTERFACE

(71) Applicant: VERIZON PATENT AND LICENSING INC., Basking Ridge, NJ (US)

(72) Inventors: Joshua Robert Russell Jacobson, San Francisco, CA (US); Avinash Chukka, San Jose, CA (US); Rigel Zeda Stone, Laguna Beach, CA (US); Anthony Richard Murphy, Newark, CA (US); Herve Bizira, Inglewood, CA (US); Richard Baba, San Bruno, CA (US); Guenever Goik, Los Angeles, CA (US); Chetan Ankola, Sunnyvale, CA (US); Bryan Sze Pui Wong, Union City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/306,193

(22) Filed: May 3, 2021

(65) Prior Publication Data
US 2021/0256772 A1 Aug. 19, 2021

Related U.S. Application Data

(63) Continuation of application No. 16/896,110, filed on Jun. 8, 2020, now Pat. No. 10,997,791, which is a (Continued)

(51) Int. Cl.
*G06T 19/00* (2011.01)
*G06F 3/0482* (2013.01)
(Continued)

(52) U.S. Cl.
CPC .......... *G06T 19/006* (2013.01); *G06F 3/0482* (2013.01); *G06F 3/04815* (2013.01);
(Continued)

(58) Field of Classification Search
CPC ............... G06F 3/04815; G06F 3/0482; G06F 3/04842; G06F 3/04883; G06T 19/006; G06T 19/20
See application file for complete search history.

(56) References Cited

U.S. PATENT DOCUMENTS

| 2014/0152698 A1 | 6/2014 | Kim et al. |
| 2014/0285522 A1 | 9/2014 | Kim et al. |

(Continued)

FOREIGN PATENT DOCUMENTS

| CN | 103853913 | 6/2014 |
| EP | 1890262 | 2/2008 |

(Continued)

OTHER PUBLICATIONS

Chehimi, et al., "Evolution of 3D games on mobile phones", International Conference on Mobile Business (ICMB'05), 2005, pp. 173-179, doi: 10.1109/ICMB.2005.39.
(Continued)

*Primary Examiner* — Seth A Silverman

(57) ABSTRACT

One or more computing devices, systems, and/or methods for presenting augmented reality (AR) interfaces are provided. For example, a first object corresponding to a representation of content in an AR interface may be presented. Responsive to receiving a selection of the first object, a first graphical object corresponding to the content may be presented. An AR interface comprising a real time view of a camera of the device may be presented. A first graphical representation of the first graphical object may be presented overlaid on the real time view of the camera of the device.
(Continued)

A second graphical representation of the first graphical object comprising the graphical modification and a second graphical object associated with information corresponding to the content may be presented overlaid on the real time view of the camera of the device. Responsive to receiving a selection of the second graphical object, the information may be presented.

20 Claims, 19 Drawing Sheets

Related U.S. Application Data continuation of application No. 15/843,780, filed on Dec. 15, 2017, now Pat. No. 10,679,414.

(51) Int. Cl.
| | |
|---|---|
| *H04L 51/52* | (2022.01) |
| *G06T 19/20* | (2011.01) |
| *G06F 3/04883* | (2022.01) |
| *G06F 3/04815* | (2022.01) |
| *G06F 3/04842* | (2022.01) |
| *G06Q 30/02* | (2012.01) |
| *G06F 3/0488* | (2022.01) |

(52) U.S. Cl.
CPC ...... *G06F 3/04842* (2013.01); *G06F 3/04883* (2013.01); *G06T 19/20* (2013.01); *H04L 51/32* (2013.01); *G06F 3/0488* (2013.01); *G06Q 30/0241* (2013.01)

(56) References Cited

U.S. PATENT DOCUMENTS

| | | |
|---|---|---|
| 2015/0040074 A1 | 2/2015 | Hofmann et al. |
| 2015/0348329 A1 | 12/2015 | Carre et al. |
| 2016/0065511 A1 | 3/2016 | Ganin et al. |
| 2017/0103575 A1 | 4/2017 | Yamamoto |

FOREIGN PATENT DOCUMENTS

| | | |
|---|---|---|
| WO | 2014/182545 | 11/2014 |
| WO | 2015/075705 | 5/2015 |

OTHER PUBLICATIONS

Chuon, et al., "Volume Cost Based Mesh Simplification", 2009 Sixth International Conference on Computer Graphics, Imaging and Visualization, 2009, pp. 164-169, doi: 10.1109/CGIV.2009.16.

PRESENTING AN AUGMENTED REALITY INTERFACE

RELATED APPLICATIONS

This application claims priority to and is a continuation of U.S. application Ser. No. 16/896,110, filed on Jun. 8, 2020, entitled "PRESENTING AN AUGMENTED REALITY INTERFACE", which claims priority to and is a continuation of U.S. application Ser. No. 15/843,780, filed on Dec. 15, 2017, entitled "PRESENTING AN AUGMENTED REALITY INTERFACE". U.S. application Ser. No. 16/896,110 and U.S. application Ser. No. 15/843,780 are both incorporated by reference herein in their entirety.

BACKGROUND

Many applications, such as email applications, instant messaging applications, social network applications and/or web-browser applications may allow a user to send and receive messages and/or emails, view social media and/or view websites. The applications may be configured to present content. However, the applications may be limited in capabilities for content presentation and/or may require the installation and/or opening of one or more separate applications to enable the presentation of dynamic content.

SUMMARY

In accordance with the present disclosure, one or more computing devices and/or methods are provided. In an example, a list of items corresponding to a representation of content may be presented in an application of a device. A first object corresponding to a representation of content in an augmented reality (AR) interface may be presented within the list of items. Responsive to receiving a selection of the first object, a first graphical object corresponding to the content may be presented. Responsive to receiving a request to overlay the first graphical object onto a live display of an area, an AR interface comprising a real time view of a camera of the device may be presented. Responsive to receiving a request to insert a representation of the first graphical object into the real time view of the camera, a first graphical representation of the first graphical object may be presented overlaid on the real time view of the camera of the device. Responsive to receiving a request to supplement the first graphical representation with a graphical modification, a second graphical representation of the first graphical object may be presented comprising the graphical modification, overlaid on the real time view of the camera of the device. A third graphical representation of the first graphical object may be presented comprising the graphical modification and a second graphical object associated with information corresponding to the content. Responsive to receiving a selection of the second graphical object, the information may be presented.

In an example, a list of items corresponding to a representation of content may be presented in an application of a device. A first object corresponding to a representation of content in an AR interface may be presented within the list of items. Responsive to receiving a request to overlay the first graphical object onto a live display of an area, an AR interface comprising a real time view of a camera of the device may be presented. Responsive to receiving a request to insert a representation of the first graphical object into the real time view of the camera, a first graphical representation of the first graphical object may be presented overlaid on the real time view of the camera of the device. Responsive to receiving a request to supplement the first graphical representation with a graphical modification, a second graphical representation of the first graphical object may be presented comprising the graphical modification and a second graphical object associated with information corresponding to the content, overlaid on the real time view of the camera of the device. Responsive to receiving a selection of the second graphical object, the information may be presented.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
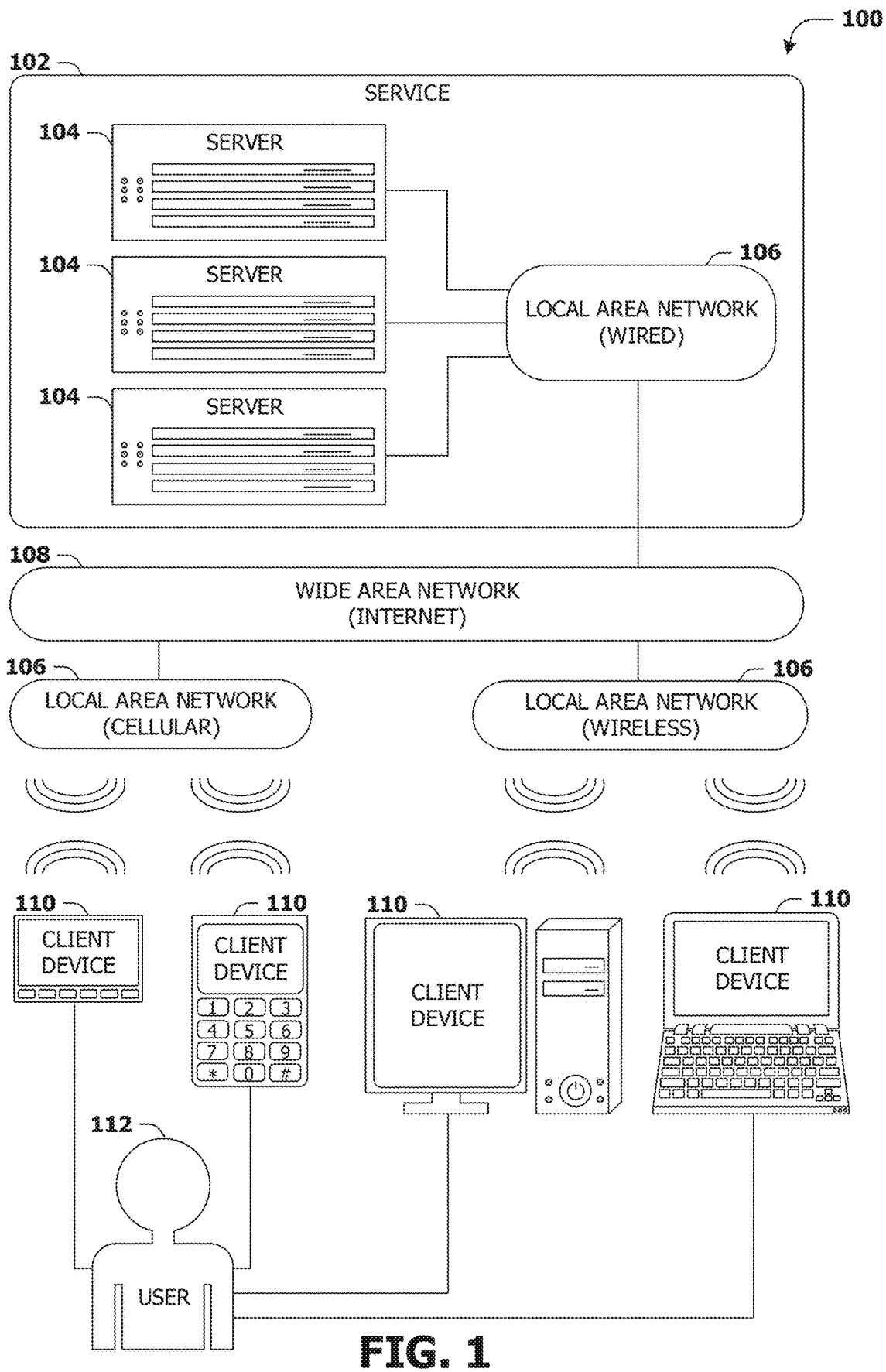
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
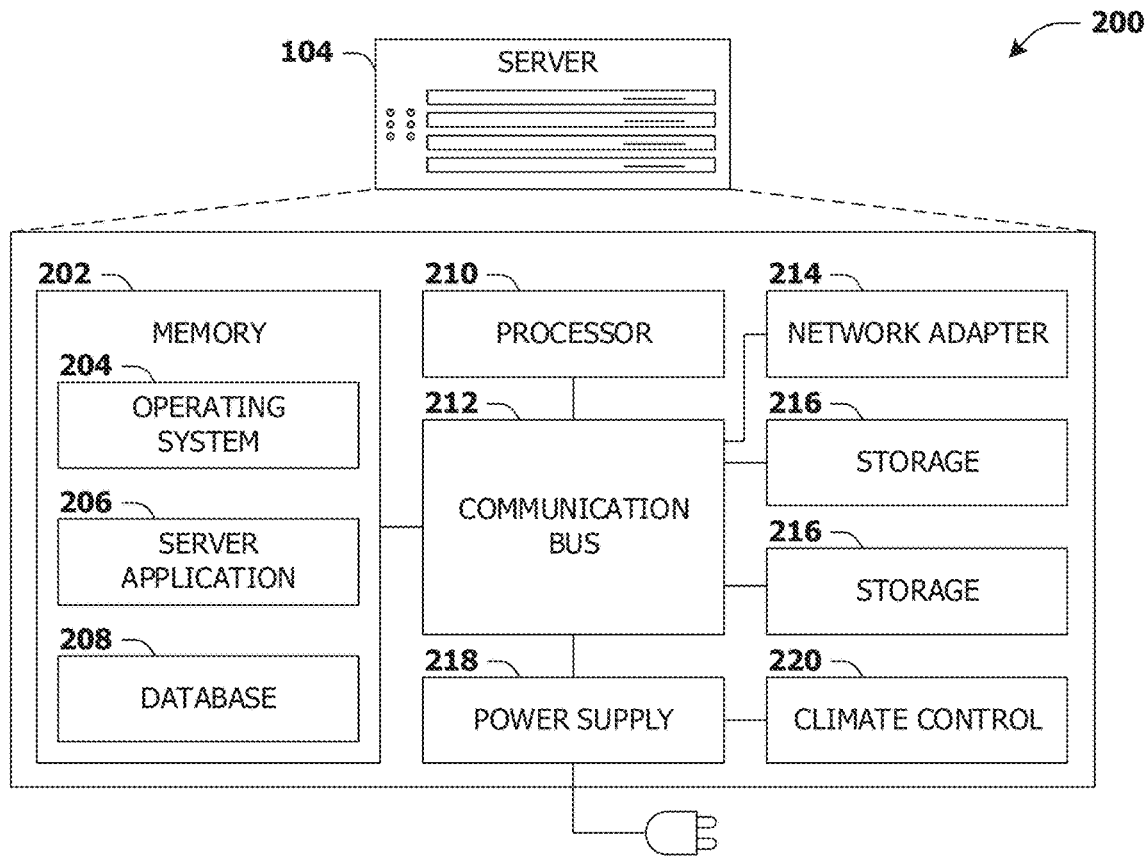
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
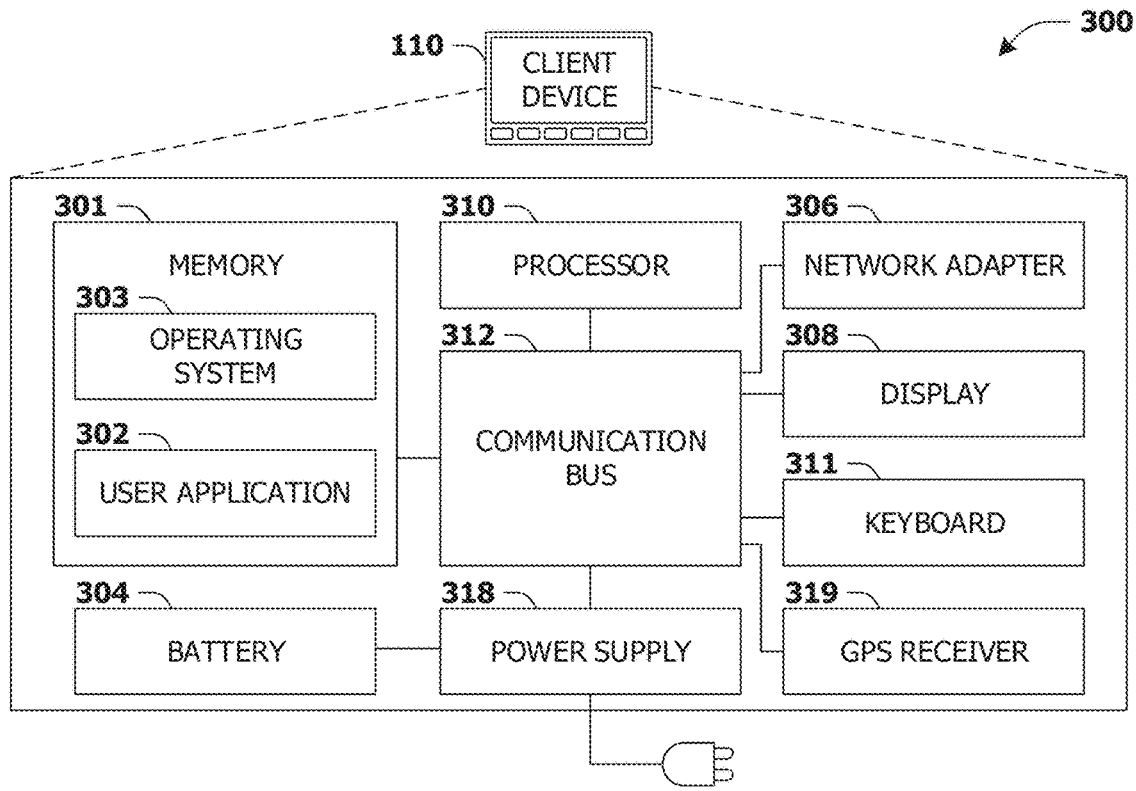
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for presenting augmented reality (e.g., AR) interfaces are provided. For example, a user may access and/or interact with an application (e.g., an instant messaging application, an email application, a web-browser application, etc.) on a device (e.g., a smartphone, a tablet, a computer, etc.). The application may present content that the user may want to view, interact with, determine a significance of and/or develop an understanding of using an AR interface. The AR interface may, for example, provide a (e.g., live) view (e.g., on a screen of the device) of a physical surrounding of the user and/or the device of the user, which may be captured and/or generated using one or more sensors (e.g., camera, microphone, gyroscope, GPS, etc.) of the device. The AR interface may insert into the (e.g., live) view one or more virtual elements (e.g., that do not actually exist in the physical surrounding of the user). However, accessing the AR interface to view, interact with, determine a significance of and/or develop an understanding of the content may require the user to install and/or open a separate application capable of providing the AR interface. Thus, in accordance with one or more of the techniques presented herein, the application may present content and, responsive to receiving a request to access the AR interface (e.g., corresponding to the content), the application may (e.g., control a graphical user interface to) present the AR interface (e.g., using the application) for the user to view, interact with, determine a significance of and/or develop an understanding of the content, without requiring the user to install and/or open a separate application.

Figure 4A:
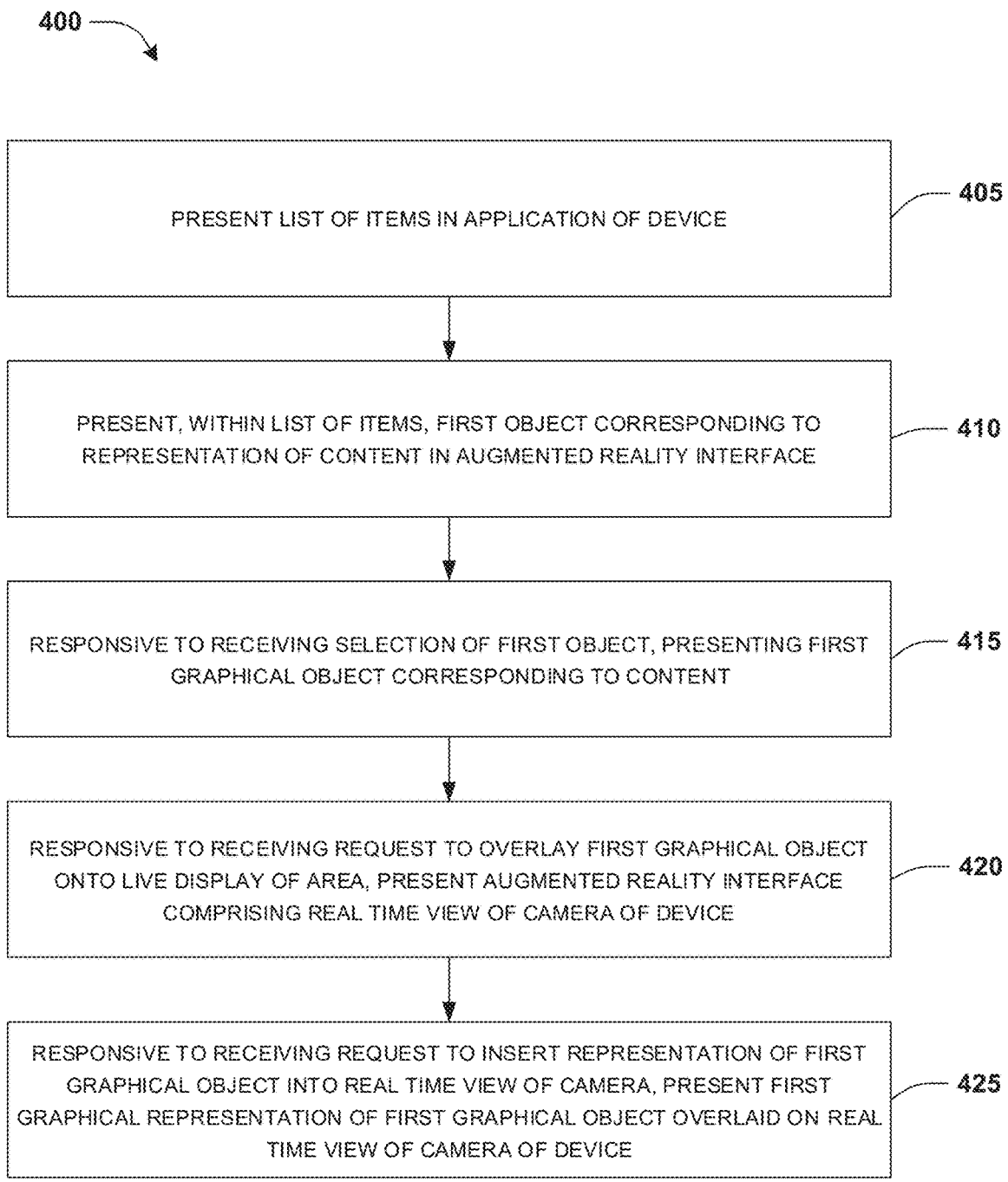
FIG. 4A is a first part of a flow chart illustrating an example method for presenting an augmented reality (AR) interface.
Figure 4B:
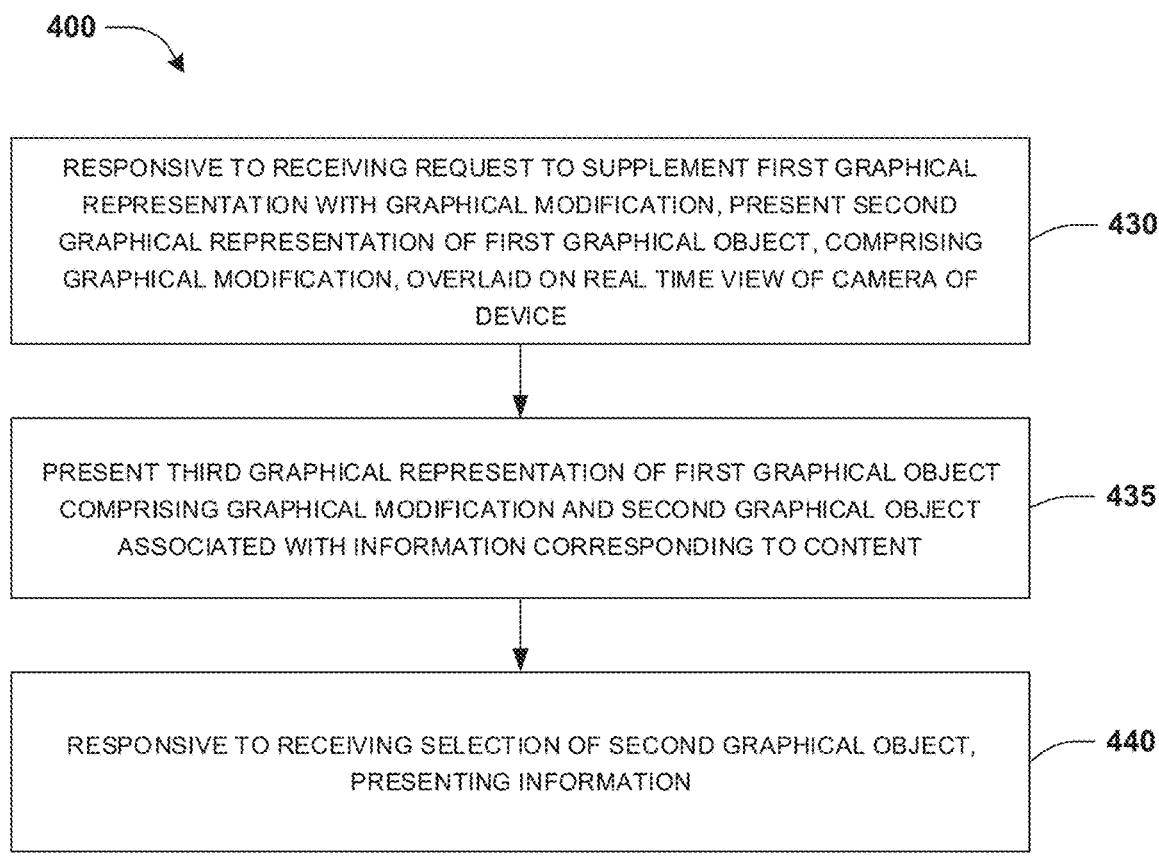
FIG. 4B is a second part of a flow chart illustrating the example method for presenting the AR interface.

An embodiment of presenting an AR interface corresponding to content is illustrated by an example method 400 of FIGS. 4A-4B. A user, such as user Jill, (e.g., and/or a device of the user) may access and/or interact with an application, such as an instant messaging application, an email application, a social network application, a web-browser application etc., on the device (e.g., a smartphone, a tablet, a computer, etc.). Accordingly, at 405, a list of items may be presented (e.g., by a server and/or the device) in the application of the device. The list of items may comprise a list of messages, a list of emails, a list of conversations, a list of contacts, a list of social media posts, a list of items and/or posts on a website, etc. associated with the application (e.g., and/or a messaging account of the user, an email account of the user, a social media account of the user, etc.).

At 410, a first object corresponding to a representation of content in an AR interface may be presented (e.g., by the server and/or the device) within the list of items. In some examples, the content may be selected from a content database comprising a plurality of sets of content. In some examples, the content database may be stored on the device and/or on the server (e.g., and/or on a second server) accessed by the device via a network connection. It may be appreciated that the selection of the content may be reflective of a determination that the user is likely to favor and/or respond to the content (e.g., the content may be associated with an advertisement and it may be determined that the user is likely to favor, respond to, purchase and/or act upon the advertisement). Accordingly, the content may be selected (e.g., determined, identified, etc.) from the plurality of sets of content based upon one or more parameters associated with the user and/or the device. For example, the content may be selected based upon one or more demographic parameters (e.g., age, income, etc.) of the user, (e.g., past) behavior of the user (e.g., and/or one or more other users associated with the user), (e.g., past) usage of the device and/or (e.g., past) usage of the application.

In some examples, the first object may comprise a title corresponding to the content, a first image (e.g., a logo, an icon, etc.) corresponding to the content (e.g., and/or a company and/or an organization promoting the content), a description of the content (e.g., and/or a graphic representing the content), a second image representing the AR interface (e.g., and/or a second description representing the AR interface) and/or an animation representing the AR interface.

In some examples, the second image and/or the animation may comprise 3-dimensional features (e.g., representing the AR interface) and/or may comprise 2-dimensional features. In an example, the animation may be presented (e.g., without presenting the second image). Alternatively and/or additionally, the second image may be presented and responsive to receiving one or more user inputs in the application, the second image may be replaced by the animation. The one or more user inputs may comprise scrolling through the list of items and/or receiving one or more selections of one or more objects and/or one or more items in the application. In some examples, the one or more inputs may be received by the device (e.g., and/or the server) using a touchscreen, a switch (e.g., an interface comprising one or more buttons), a conversational interface (e.g., a voice recognition and natural language interface) and/or a different type of interface. In some examples, a speed of the animation (e.g., and/or representation of movement of the animation) may be based upon a speed of the scrolling through the list of items. For example, the speed of the animation may increase responsive to an increase of the speed of the scrolling through the list of items. In some examples, the animation may be related to the second image (e.g., and/or the animation may represent a continuation of the second image). In an example, the second image may represent a cube and the animation may represent the cube changing (e.g., morphing) into a different representation of the cube (e.g., a different color, a different size, a different theme, etc.) and/or the animation may represent the cube moving (e.g., rotating, spinning, moving in different directions, etc.).

In a first example, first content may correspond to an airplane. Accordingly, the first object (e.g., corresponding to the first content) may comprise a second title "Airplanes". The first object may comprise a third image corresponding to the first content (e.g., an image of an airplane). Alternatively and/or additionally, the third image may correspond to a company and/or an organization associated with the first content (e.g., a logo of an airplane manufacturer, a logo of an organization promoting airplane safety, etc.). The first object may (e.g., further) comprise a second description "See our new airplanes fly", the second image representing the AR interface and/or the animation representing the AR interface.

In a second example, second content may correspond to a snowman. Accordingly, the first object (e.g., corresponding to the second content) may comprise a third title "Snowmen". The first object may comprise a fourth image corresponding to the second content (e.g., an image of a snowman). Alternatively and/or additionally, the third image may correspond to a company and/or an organization associated with the second content (e.g., a logo of a company manufacturing snow-related accessories, a logo of an organization promoting family-togetherness, etc.). The first object may (e.g., further) comprise a third description "Build a snowman", the second image representing the AR interface and/or the animation representing the AR interface.

At 415, responsive to receiving a selection of the first object, a first graphical object corresponding to the content may be presented. In some examples, the selection of the first object may be received by the device (e.g., and/or the server) using the touchscreen, the switch, the conversational interface and/or a different type of interface. Responsive to receiving the selection of the first object, the list of items may not (e.g., and/or no longer) be presented and/or the first graphical object may be presented on a background (e.g., a colored background, a blank background, a background picture, etc.). The first graphical object may (e.g., appear to) be 3-dimensional and/or may be 2-dimensional. In some examples, a logo (e.g., an icon, a symbol, an image) associated with the content (e.g., and/or the company and/or the organization promoting the content) may be presented adjacent to (e.g., above, below, next to, etc.) the first graphical object.

In some examples, responsive to receiving one or more user inputs using the touchscreen, the switch, the conversational interface and/or a different type of interface, one or more graphical objects corresponding to one or more sets of content from the content database may be presented. For example, responsive to sliding one or more objects horizontally (e.g., and/or vertically) on the touchscreen (e.g., and/or using the switch and/or the conversational interface), a graphical object corresponding to fourth content (e.g., from the content database) may be presented (e.g., in place of first graphical object). Responsive to (e.g., further) sliding the one or more objects horizontally (e.g., and/or vertically) on the touchscreen (e.g., and/or using the switch and/or the conversational interface), a graphical object corresponding to fifth content may be presented (e.g., in place of the first graphical object and/or the graphical object corresponding to the fourth content). In some examples, the fourth content and/or the fifth content may be selected (e.g., for presentation to the user) based upon the content (e.g., the fourth content and/or the fifth content may be related to the content). Alternatively and/or additionally, the fourth content and/or the fifth content may be selected (e.g., for presentation to the user) based upon the one or more demographic parameters (e.g., age, income, etc.) of the user, the (e.g., past) behavior of the user (e.g., and/or one or more other users associated with the user), the (e.g., past) usage of the device and/or the (e.g., past) usage of the application. In some examples, responsive to receiving one or more user inputs using the touchscreen, the switch, the conversational interface and/or a different type of interface, a content database interface (e.g., comprising a menu) may be presented. In some examples, the user may view and/or browse through a plurality of graphical objects and/or a plurality of sets of information corresponding to the plurality of sets of content in the content database interface. In some examples, the content database interface may provide a search area that may be used to search the content database interface using keywords. It may be appreciated that the content, the fourth content, the fifth content, etc. may correspond to products, vehicles, characters, etc., and may share a common source (e.g., catalog, marketplace, seller, producer, etc.).

In the first example (e.g., of the first content corresponding to the airplane), the first graphical object may comprise a (e.g., 2-dimensional and/or 3-dimensional) representation of an airplane and/or the logo may comprise the logo of the airplane manufacture, the logo of the organization promoting airplane safety, etc. In the second example, (e.g., of the second content corresponding to the snowman), the first graphical object may comprise a (e.g., 2-dimensional and/or 3-dimensional) representation of a snowman and/or the logo may comprise the logo of the company manufacturing snow-related accessories, the logo of the organization promoting family-togetherness, etc.

At 420, responsive to receiving a request to overlay the first graphical object onto a live display of an area, an AR interface comprising a real time view of a camera of the device may be presented. In some examples, the request to overlay the first graphical object onto the live display of the area may be received by the device (e.g., and/or the server) using the touchscreen, the switch, the conversational interface and/or a different type of interface. In some examples, the AR interface may comprise one or more instructions for guiding the user through one or more steps necessary for implementing the AR interface. For example, a first step may comprise initializing the AR interface. A first instruction (e.g., corresponding to the first step) may be overlaid onto the real time view of the camera of the device, directing the user to hold the device and/or the camera steadily (e.g., the first instruction may comprise "Initializing, HOLD CAMERA STEADILY").

In some examples, upon completion of the first step, a second step may begin. The second step may comprise a first part of detecting a plane (e.g., corresponding to a wall, a floor, a surface of an object, etc.) and/or mapping a surface. A second instruction (e.g., corresponding to the second step) may be overlaid onto the real time view of the camera of the device, directing the user to move the device and/or the camera in one or more directions (e.g., the second instruction may comprise "DETECTING SURFACE, MOVE PHONE SLOWLY"). In some examples, one or more first graphics may be overlaid onto the real time view of the camera of the device to assist the user to perform the second instruction (e.g., the one or more first graphics may comprise a first representation of a phone moving in the one or more directions).

In some examples, upon completion of the second step, a third step may begin. The third step may comprise a second part of detecting the plane and/or mapping the surface. A third instruction (e.g., corresponding to the third step) may be overlaid onto the real time view of the camera of the device, directing the user to move the phone and/or the camera in one or more directions and/or to point the phone and/or the camera to one or more places (e.g., the third instruction may comprise "POINT CLOSE TO THE SURFACE, MOVE PHONE AS SHOWN UNTIL TILES DISAPPEAR"). In some examples, one or more second graphics may be overlaid onto the real time view of the camera of the device to assist the user to perform the third instruction (e.g., the one or more second graphics may comprise a second representation of a phone moving in one or more directions and/or a set of tiles overlaid onto the plane and/or the surface). In some examples, upon completion of the third step, the third instruction may be removed (e.g., no longer overlaid onto the real time view of the camera of the device) and/or the one or more second graphics may change (e.g., morph) into a different representation of the one or more second graphics (e.g., the one or more second graphics may change color, the one or more second graphics may change size, etc.). In some examples, a fourth instruction may be overlaid onto the real time view of the camera of the device, directing the user to select a location on the real time view of the camera of the device for placement of the first graphical object (e.g., the fourth instruction may comprise "TAP TO PLACE OBJECT").

At 425, responsive to receiving a request to insert a representation of the first graphical object into the real time view of the camera, presenting a first graphical representation of the first graphical object overlaid on the real time view of the camera of the device. In some examples, the request to insert the representation of the first graphical object into the real time view of the camera may be received by the device (e.g., and/or the server) using the touchscreen, the switch, the conversational interface and/or a different type of interface. In some examples, upon presenting the first graphical representation of the first graphical object, audio corresponding to the content may be output using a speaker. In some examples, the audio may comprise music, one or more sound effects, one or more instructions and/or information about the content and/or the first graphical object. In some examples, the logo associated with the content (e.g., and/or the company and/or the organization promoting the content) may be presented adjacent to (e.g., above, below, next to, etc.) the first graphical representation (e.g., of the first graphical object). A fifth instruction may be presented, directing the user to select one or more modifications (e.g., additions, changes, etc.) to the first graphical representation (e.g., of the first graphical object).

In some examples, responsive to receiving one or more user inputs using the touchscreen, the switch, the conversational interface and/or a different type of interface, one or more graphical representations of the one or more graphical objects corresponding to the one or more sets of content from the content database may be presented. For example, responsive to sliding one or more objects horizontally (e.g., and/or vertically) on the touchscreen (e.g., and/or using the switch and/or the conversational interface), a graphical representation of the graphical object corresponding to the fourth content may be presented overlaid on the real time view of the camera of the device. Responsive to (e.g., further) sliding the one or more objects horizontally (e.g., and/or vertically) on the touchscreen (e.g., and/or using the switch and/or the conversational interface), a graphical representation of the graphical object corresponding to the fifth content may be presented overlaid on the real time view of the camera of the device.

At 430, responsive to receiving a request to supplement the first graphical representation with a graphical modification, a second graphical representation of the first graphical object comprising the graphical modification may be presented overlaid on the real time view of the camera of the device. In some examples, the request to supplement the first graphical representation with the graphical modification may be received by the device (e.g., and/or the server) using the touchscreen, the switch, the conversational interface and/or a different type of interface. In some examples, the graphical modification may comprise removing at least a portion of the first graphical representation, adding an animation (e.g., a 3-dimensional animation and/or a 2-dimensional animation) to the first graphical representation, adding one or more objects (e.g., 3-dimensional objects and/or 2-dimensional objects) to the first graphical representation and/or changing at least a portion of the first graphical representation. In some examples, the logo associated with the content (e.g., and/or the company and/or the organization promoting the content) may be presented adjacent to (e.g., above, below, next to, etc.) the second graphical representation (e.g., of the first graphical object).

In some examples, the first graphical representation and the second graphical representation (e.g., comprising the graphical modification) may correspond to parts (e.g., stages) of a storyline (e.g., a plot, a script, etc.) associated with the content. Each part of the parts of the storyline may correspond to (e.g., different) graphical representations and/or graphical modifications. For example, the first graphical representation may correspond to a first part of the storyline, the second graphical representation may correspond to a second part of the storyline, a third graphical representation may correspond to a third part of the storyline, etc. In some examples, each part of the parts of the storyline may correspond to one or more (e.g., different) audio outputs. For example, first audio (e.g., comprising music, sound effects, instructions and/or information) may be outputted at the first part of the storyline (e.g., during presentation of the first graphical representation), second audio (e.g., comprising music, sound effects, instructions and/or information) may be outputted at the second part of the storyline (e.g., during presentation of the second graphical representation), third audio (e.g., comprising music, sound effects, instructions and/or information) may be outputted at the third part of the storyline (e.g., during presentation of a third graphical representation of the first graphical object), etc.

In the first example (e.g., of the first content corresponding to the airplane), the first graphical representation may comprise a base model of the airplane corresponding to the first part of the storyline. The fifth instruction may be presented to direct the user to select one or more modifications to the first graphical representation and/or to guide the user to the second part of the storyline. For example, the fifth instruction may comprise "Please select the color of the airplane" and a list of colors to guide the user to the second part of the storyline (e.g., where a color of the airplane is presented). The second graphical representation (e.g., corresponding to the second part of the storyline) may be generated and/or presented based upon the graphical modification (e.g., comprising the color of the airplane) corresponding to one or more user inputs. A sixth instruction may (e.g. then) be presented to direct the user to select one or more modifications to the second graphical representation and/or the guide the user to the third part of the storyline. For example, the sixth instruction may comprise "Press to take off" to guide the user to the third part of the storyline (e.g., where the airplane flies into the sky). The third graphical representation (e.g., corresponding to the third part of the storyline) may be generated and/or presented based upon a second graphical modification (e.g., comprising an animation representing the airplane taking off into the sky overlaid on the real time view of the camera) corresponding to one or more user inputs.

In some examples, a first perspective of the first graphical representation, the second graphical representation, the third graphical representation, etc. may be modified to a second perspective of the first graphical representation, the second graphical representation, the third graphical representation, etc. responsive to a change of the view of the camera of the device and/or one or more user inputs (e.g., received via the touchscreen, the switch, the conversational interface, etc.). Alternatively and/or additionally, a size of the first graphical representation, the second graphical representation, the third graphical representation, etc. may be modified responsive to one or more user inputs (e.g., received via the touchscreen, the switch, the conversational interface, etc.) (e.g., the size may become larger responsive to pinching out and/or double tapping on the touchscreen, the size may become smaller responsive to pinching in and/or double tapping on the touchscreen, etc.). Alternatively and/or additionally, the location of the first graphical representation, the second graphical representation, the third graphical representation, etc. may be modified to a second location responsive to one or more user inputs (e.g., received via the touchscreen, the switch, the conversational interface, etc.) (e.g., dragging the first graphical representation, the second graphical representation, the third graphical representation, etc. using the touchscreen from the location to the second location).

In some examples, the first graphical object, the first graphical representation, the second graphical representation, the third graphical representation, etc. may be (e.g., generated and/or presented) based upon one or more parameters of the device and/or a network the device is connected to. For example, one or more parameters of the device, such as processing power, operating system, memory parameters, a lighting of surroundings of the device, etc., and/or one or more parameters of the network, such as a type of network (e.g., Wi-Fi network, cellular network, etc.), bandwidth, etc., may be determined. Dynamic lighting in the AR interface, one or more resolutions of (e.g., textures corresponding to) the first graphical object, the first graphical representation, the second graphical representation, the third graphical representation, etc. and/or one or more polygon counts of (e.g., textures corresponding to) the first graphical object, the first graphical representation, the second graphical representation, the third graphical representation, etc. may be determined and/or activated based upon the one or more parameters of the device and/or the one or more parameters of the network.

In some examples, responsive to receiving a request to record and/or share a video, the video may be recorded of at least a portion of the first graphical representation, the second graphical representation, the third graphical representation, etc. (e.g., overlaid on the real time view of the camera) and/or the video may be stored. In some examples, the video may be recorded and/or stored automatically (e.g., and deleted from storage after a defined period of time). In some examples, the video may be transmitted to one or more devices. For example, responsive to receiving a selection of a second device as a sharing recipient via a sharing interface, the video may be transmitted to the second device. In some examples, the sharing interface may be accessed responsive to one or more user inputs received using the touchscreen, the switch, the conversational interface and/or a different type of interface (e.g., pressing one or more objects on the touchscreen, sliding one or more objects vertically on the touchscreen, sliding one or more objects horizontally on the touchscreen, etc.). In some examples, the request to record the video and/or the selection of the second device as the sharing recipient may be received by the device (e.g., and/or the server) using the touchscreen, the switch, the conversational interface and/or a different type of interface (e.g., using the application, the AR interface and/or an interface on the device).

Alternatively and/or additionally, responsive to receiving a request to capture and/or share an image of the first graphical representation, the second graphical representation, the third graphical representation, etc. (e.g., overlaid on the real time view of the camera), the image may be captured and/or the image may be stored. In some examples, the image may be recorded and/or stored automatically (e.g., and deleted from storage after a defined period of time). In some examples, the image may be transmitted to one or more devices. For example, responsive to receiving a selection of a third device as a sharing recipient via the sharing interface, the image may be transmitted to the third device. In some examples, the request to capture the image and/or the selection of the third device as the sharing recipient may be received by the device (e.g., and/or the server) using the touchscreen, the switch, the conversational interface and/or a different type of interface (e.g., using the application, the AR interface and/or an interface on the device).

In an example, the request to record the video may comprise sliding one or more objects on the touchscreen in a first direction (e.g., upwards) and the request to capture the image may comprise sliding one or more objects on the touchscreen in a second direction (e.g., downwards). Alternatively and/or additionally, a request to share the image and/or the video with the second device and/or the third device via a first form of communication (e.g., email) may comprise sliding one or more objects on the touchscreen in a third direction (e.g., from left to right) and a request to share the image and/or the video with the second device and/or the third device via a second form of communication (e.g., messaging interface) may comprise sliding one or more objects on the touchscreen in a fourth direction (e.g., from right to left).

Alternatively and/or additionally, responsive to receiving a request to transmit a link for accessing the content in the AR interface, the link for accessing the content in the AR interface may be transmitted to one or more devices. For example, responsive to receiving a selection of a fourth device as a sharing recipient via the sharing interface, the link may be transmitted to the fourth device. In some examples, the selection of the fourth device as the sharing recipient may be received by the device (e.g., and/or the server) using the touchscreen, the switch, the conversational interface and/or a different type of interface (e.g., using the application, the AR interface and/or an interface on the device). In some examples, the content may be accessed using the AR interface (e.g., and/or a different AR interface) via the application (e.g., and/or a different application) by the fourth device.

In some examples, the video, image and/or link shared may correspond to the experience of the accessing of the content in the AR interface by the device, and may thus show one or more portions of the real time view of the camera and/or the surroundings of the user, and/or may reflect (e.g., physical) movements (e.g., panning) of the device. In some examples, the video, image and/or link shared may be generic to the content and thus may not include one or more portions of the real time view of the camera and/or the surroundings of the user, and/or may not reflect (e.g., physical) movements (e.g., panning) of the device. In some examples, the video, image and/or link may be customized by the user (e.g., to add an image (e.g., of the user), text, information, etc.) prior to sharing.

At 435, a fourth graphical representation of the first graphical object comprising the graphical modification (e.g., and/or the second graphical medication, a third graphical modification, etc.) and a second graphical object associated with information corresponding to the content may be presented. In some examples, the fourth graphical representation may be overlaid on the real time view of the camera of the device. In some examples, the logo associated with the content (e.g., and/or the company and/or the organization promoting the content) may be presented adjacent to (e.g., above, below, next to, etc.) the fourth graphical representation (e.g., of the first graphical object).

In some examples, one or more of the graphical representations may (e.g., upon being inserted) be associated with a (e.g., physical) location determined based upon the real time view of the camera (e.g., where the one or more graphical representations correspond to an inanimate object). For example, the location may correspond to (e.g., GPS) coordinates, and/or may be determined in association with (e.g., relative to) one or more (e.g., physical) objects identified (e.g., via the camera) and/or displayed in the real time view (e.g., between a window and a coffee table). Thus, when the real time view of the camera of the device is modified (e.g., based upon a physical movement of the camera and/or the device), the one or more graphical representations may (e.g., continue to) be linked to the location (e.g., and may be presented from one or more alternative and/or calculated perspectives).

In some examples, the one or more graphical representations may be associated with a (e.g., simulated and/or virtual physical) behavior and/or pattern determined based upon the real time view of the camera (e.g., where the one or more graphical representations correspond to an animate object). A map of a surrounding of the device may be generated (e.g., based upon inputs of one or more sensors of the device), and/or one or more (e.g., simulated and/or virtual) movements may be calculated and/or implemented by the animate object. For example, an airplane may fly, a car may drive and/or an animal may run in a direction and/or along a path (e.g., calculated and/or customized based upon the mapping of the surrounding). Thus, when the real time view of the camera of the device is modified (e.g., based upon a physical movement of the camera and/or the device), the one or more graphical representations may be represented in association with the movements. For example, a user may be encouraged to physically move the device in a manner that allows the user to virtually "see" the animated object moving.

In some examples, the second graphical object may be presented during presentation of the first graphical representation, the second graphical representation and/or the third graphical representation. For example, the second graphical representation may comprise the second graphical object. Alternatively and/or additionally, the second graphical object may be presented upon completion of one of the parts of the storyline. Alternatively and/or additionally, the second graphical object may be presented upon completion of the (e.g., entirety of the) storyline.

The second graphical object may comprise a representation of the information corresponding to the content. In the first example (e.g., of the first content corresponding to the airplane), the second graphical object may comprise "Learn more about airplanes". In the second example (e.g., of the second content corresponding to the snowman), the second graphical object may comprise "See our winter accessories". The second graphical object may be linked to a website and responsive to receiving a selection of the second graphical object (e.g., pressing the second graphical object on the touchscreen), the website may be presented using the application (e.g., and/or a different application).

Accordingly, at 440, responsive to receiving a selection of the second graphical object, the information may be presented. In some examples, the selection of the second graphical object may be received by the device (e.g., and/or the server) using the touchscreen, the switch, the conversational interface and/or a different type of interface. In some examples, the information may be presented via the website and/or an interface within the application (e.g., and/or a different application). In some examples, audio outputted prior to the presentation of the information may continue to be outputted during presentation of the information. In some examples, the logo (e.g., presented adjacent to the first graphical representation, the second graphical representation, the third graphical representation, the fourth graphical representation, etc.) may be linked to the information (e.g., and/or the website comprising the information) and/or second information (e.g., and/or a second website comprising the second information). Accordingly, responsive to receiving a selection of the logo, the information and/or the second information may be presented (e.g., via the website and/or the second website). In some examples, the selection of the logo may be received by the device (e.g., and/or the server) using the touchscreen, the switch, the conversational interface and/or a different type of interface.

In some examples, one or more metrics of the AR interface and/or the content may be determined (e.g., gathered) (e.g., by the server and/or the device). The one or more metrics may comprise a length of time the AR interface was accessed by the device, a distance of movement of the device while the AR interface was accessed, a type of area (e.g., outdoors, indoors, big room, small room, etc.) viewed by the camera of the device while the AR interface was accessed, one or more items viewed by the camera of the device while the AR interface was accessed (e.g., a coffee table, a lamp, a fence, etc.), perspectives and/or parts of the first graphical representation, the second graphical representation, the third graphical representation, etc. that were presented (e.g., and/or viewed by the user using the AR interface), a number of graphical representations presented (e.g., compared to a total number of graphical representations corresponding to the storyline), a length of time each of the first graphical representation, the second graphical representation, the third graphical representation, etc. were presented, a length of time between the presentation of the second graphical object and the selection of the second graphical object, one or more images and/or videos of the first graphical representation, the second graphical representation, the third graphical representation, etc. that were shared (e.g., and/or transmitted to one or more devices), a distance between the device and the location of placement of the first graphical object, one or more distances between the device and one or more other locations of the first graphical representation, the second graphical representation, the third graphical representation, etc., a number of location changes of the first graphical representation, the second graphical representation, the third graphical representation, etc., a number of size changes of the first graphical representation, the second graphical representation, the third graphical representation, etc. and/or a failure rate (e.g., and/or a success rate) associated with the steps necessary for implementing the AR interface. In some examples, the one or more metrics may be stored and/or transmitted to a fifth device (e.g., corresponding to a developer of the AR interface, a developer of the first graphical object, the first graphical representation, the second graphical representation, the third graphical representation, etc., the company and/or the organization promoting the content). In some examples, the fifth device may aggregate metrics from a plurality of devices and use the metrics to perform one or more actions, modify content, generate recommendations, etc. In some examples, the AR interface and/or the content (e.g., and/or the first object, the first graphical object, the second graphical object, the first graphical representation, the second graphical representation, the third graphical representation, etc. corresponding to the content and/or to the AR interface) may be edited (e.g., modified) based upon the one or more metrics (e.g., automatically and/or based upon a request from the fifth device).

In some examples, the AR interface and/or the content (e.g., and/or the first object, the first graphical object, the second graphical object, the first graphical representation, the second graphical representation, the third graphical representation, etc. corresponding to the content and/or to the AR interface) may be generated (e.g., and/or edited) based upon third information corresponding to the AR interface and/or the content. For example, a template (e.g., a function, an algorithm, a program, etc.) may be applied to the third information to generate a model comprising the first object, the first graphical object, the second graphical object, the first graphical representation, the second graphical representation, the third graphical representation, etc. The third information may be received by and/or from the fifth device (e.g., and/or one or more other devices) via (e.g., a form presented on) a third website and/or a second application. In some examples, the third information may comprise one or more textures, one or more AR parameters, one or more 2-dimensional images, one or more 3-dimensional images and/or one or more links (e.g., corresponding to the information and/or the website) corresponding to the content.

In some examples, a second plurality of sets of information (e.g., a catalog of products) may be received from the fifth device corresponding to a second plurality of sets of content. In some examples, each of the second plurality of sets of information may comprise one or more textures, one or more AR parameters, one or more 2-dimensional images, one or more 3-dimensional images and/or one or more links (e.g., corresponding to information and/or one or more websites corresponding to each of the second plurality of sets of information). In some examples, the template may be applied (e.g., automatically) to each of the second plurality of sets of information to generate a plurality of models (e.g., each) corresponding to the second plurality of sets of content (e.g., and/or to the second plurality of sets of information). In some examples, each of the plurality of models may comprise one or more graphical objects, one or more graphical representations and/or one or more instructions for implementing the AR interface to present (e.g., each of) the second plurality of sets of content. In some examples, each of the plurality of models may (e.g., further) comprise one or more tags (e.g., and/or keywords) used for selecting from among the second plurality of sets of content for presentation (e.g., to one or more users) using the AR interface. In some examples, the second plurality of sets of content may be uploaded (e.g., and/or stored) in the content database. Upon selection of one or more of the second plurality of sets of content, one or more models (e.g., of the plurality of models) corresponding to the one or more of the second plurality of sets of content may be used to implement the AR interface.

Figure 5A:
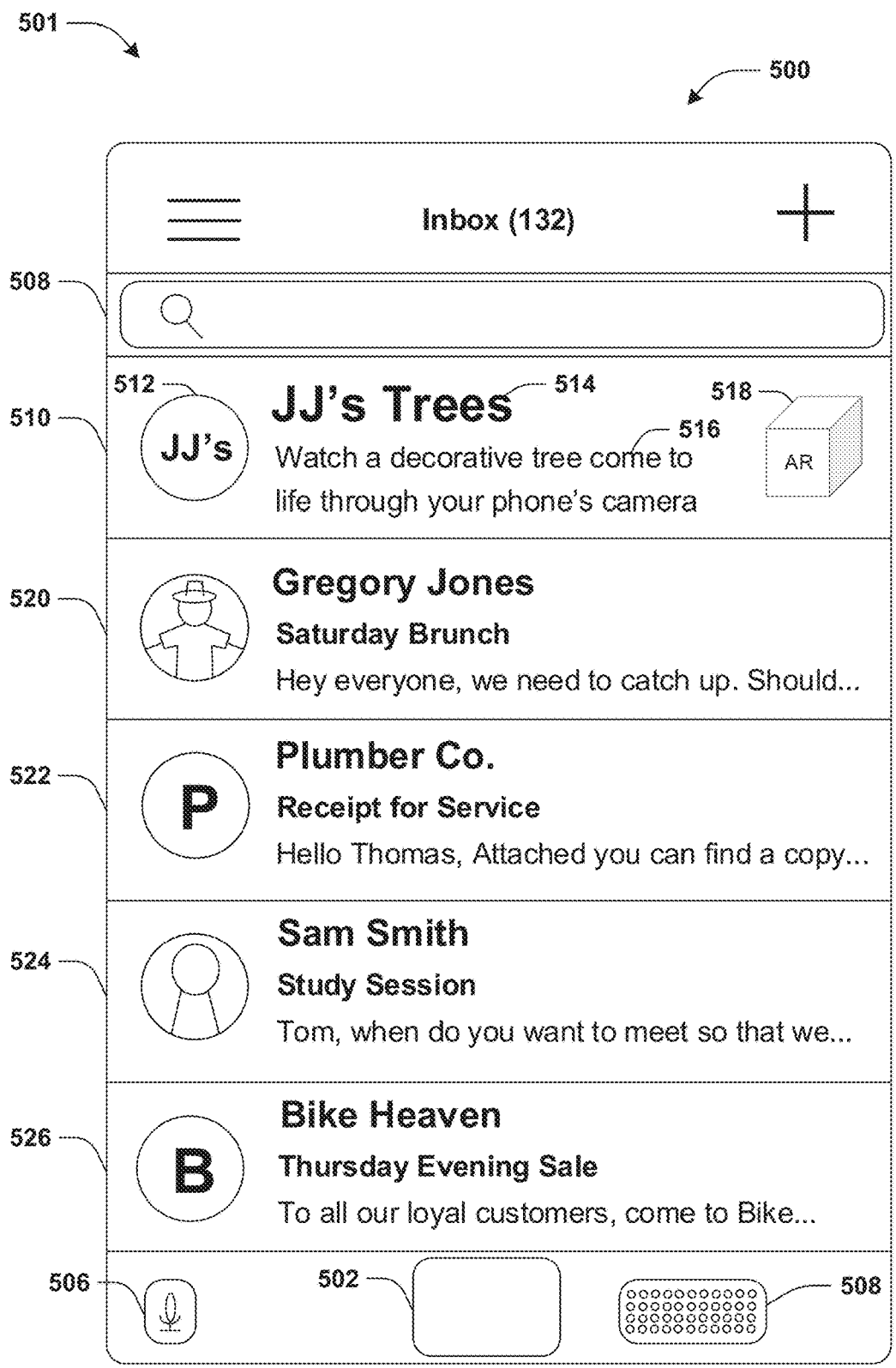
FIG. 5A is a component block diagram illustrating an example system for presenting an AR interface, where an application comprising a list of items is presented.
Figure 5B:
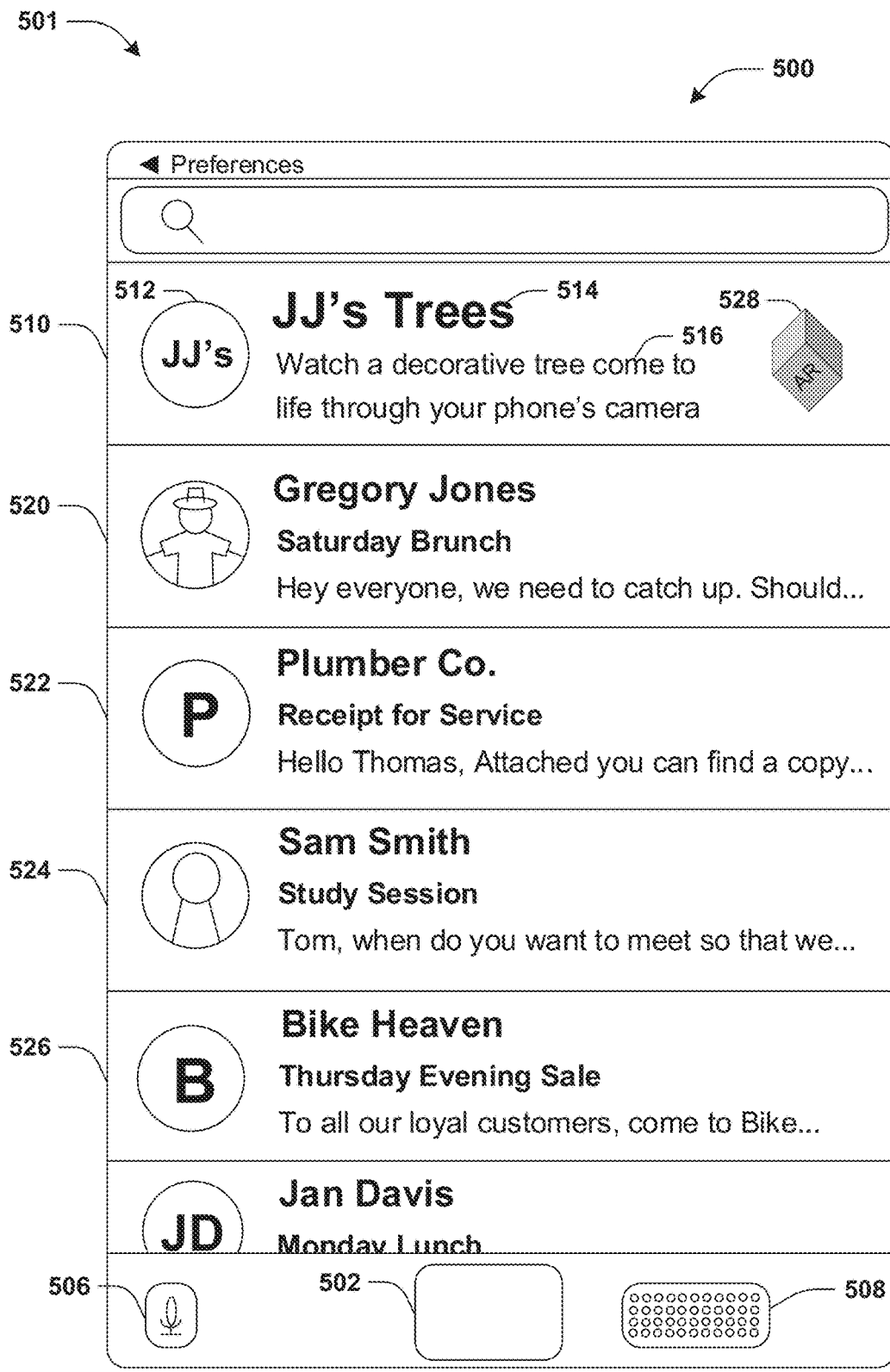
FIG. 5B is a component block diagram illustrating an example system for presenting an AR interface, where an animation is presented responsive to receiving one or more user inputs.
Figure 5C:
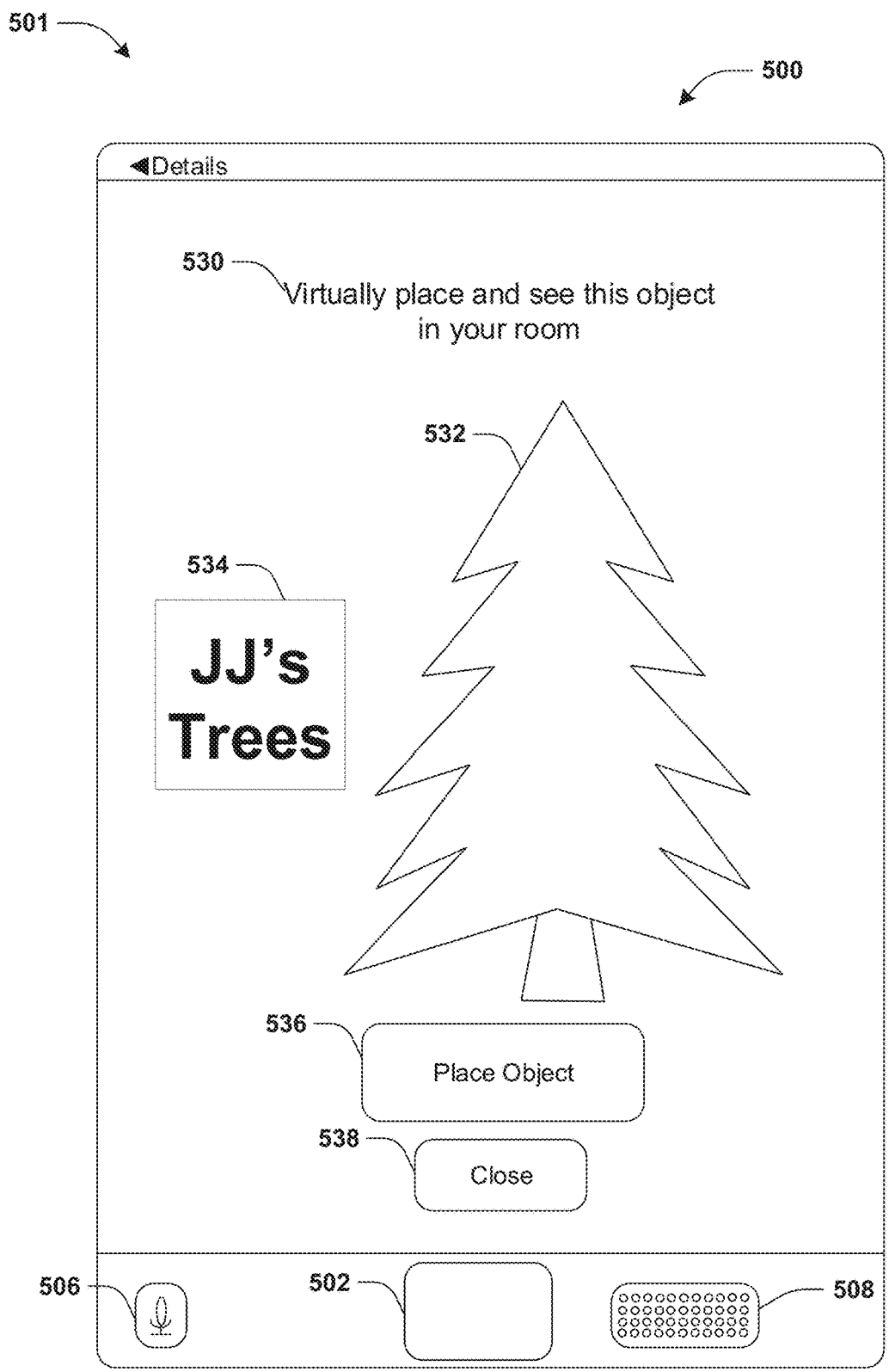
FIG. 5C is a component block diagram illustrating an example system for presenting an AR interface, where a first graphical object is presented responsive to receiving a selection of a first object.
Figure 5D:
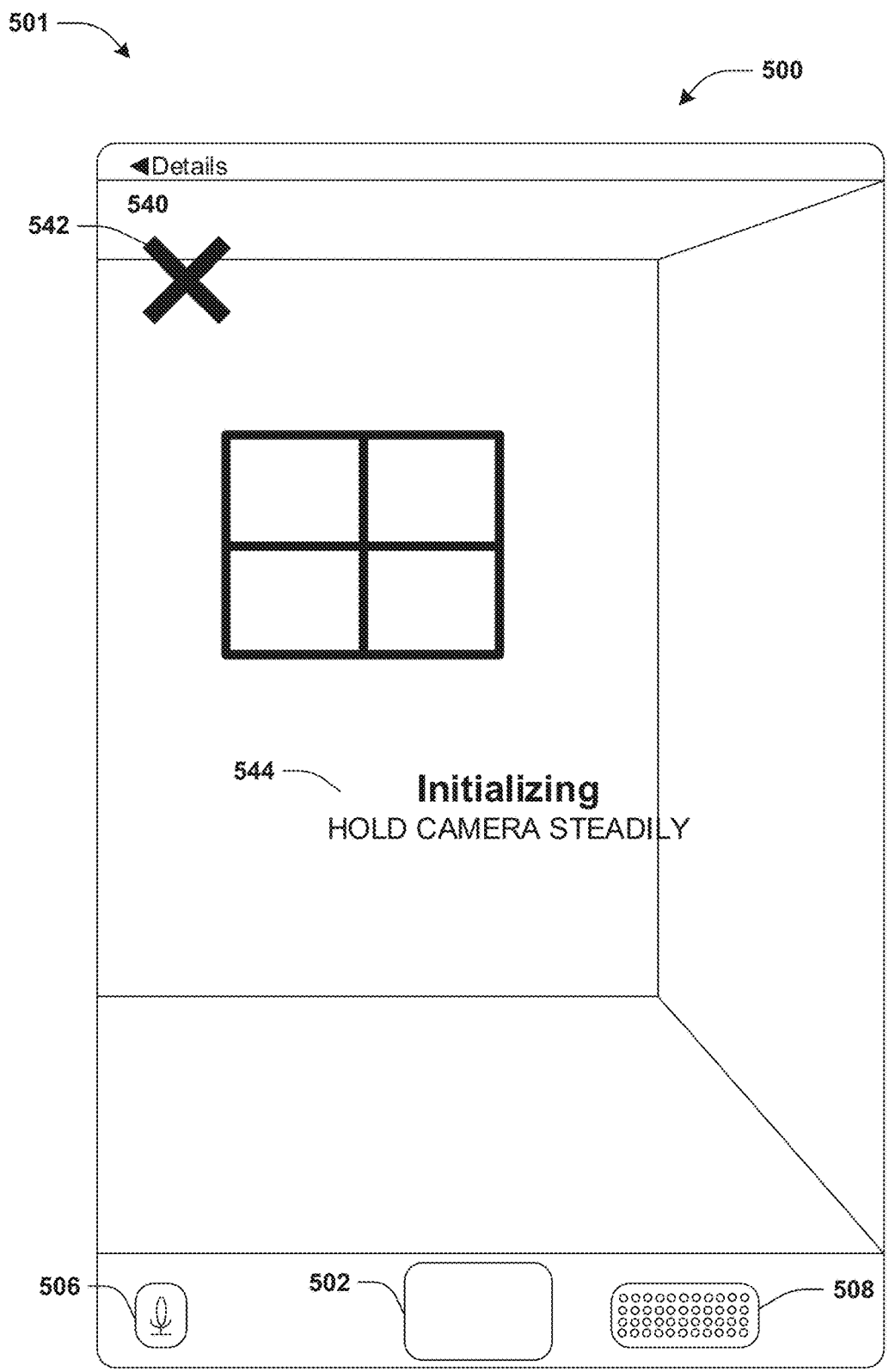
FIG. 5D is a component block diagram illustrating an example system for presenting an AR interface, where an AR interface comprising a real time view of a camera of a device is presented.
Figure 5E:
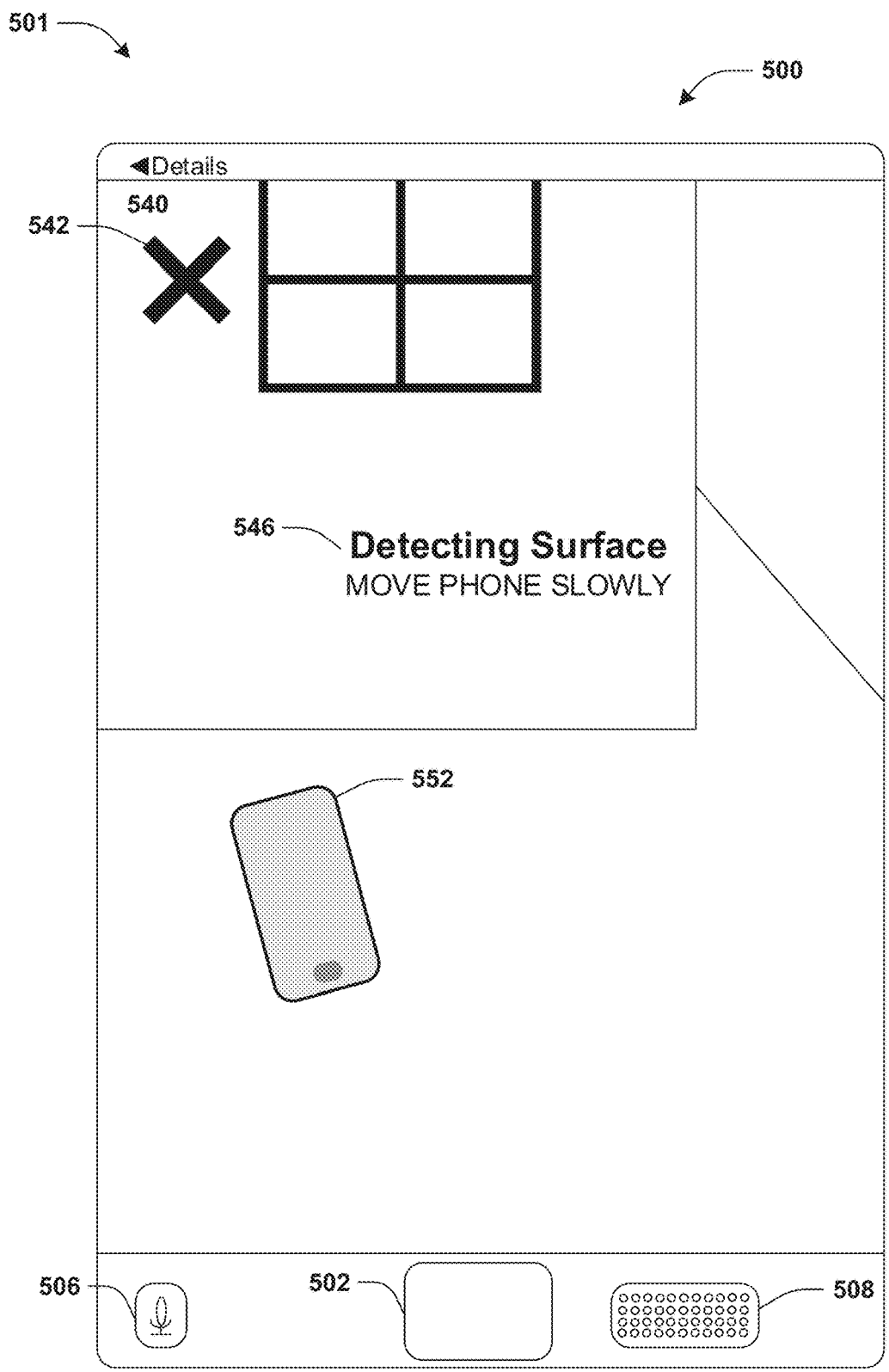
FIG. 5E is a component block diagram illustrating an example system for presenting an AR interface, where a third instruction and a first graphic are presented.
Figure 5F:
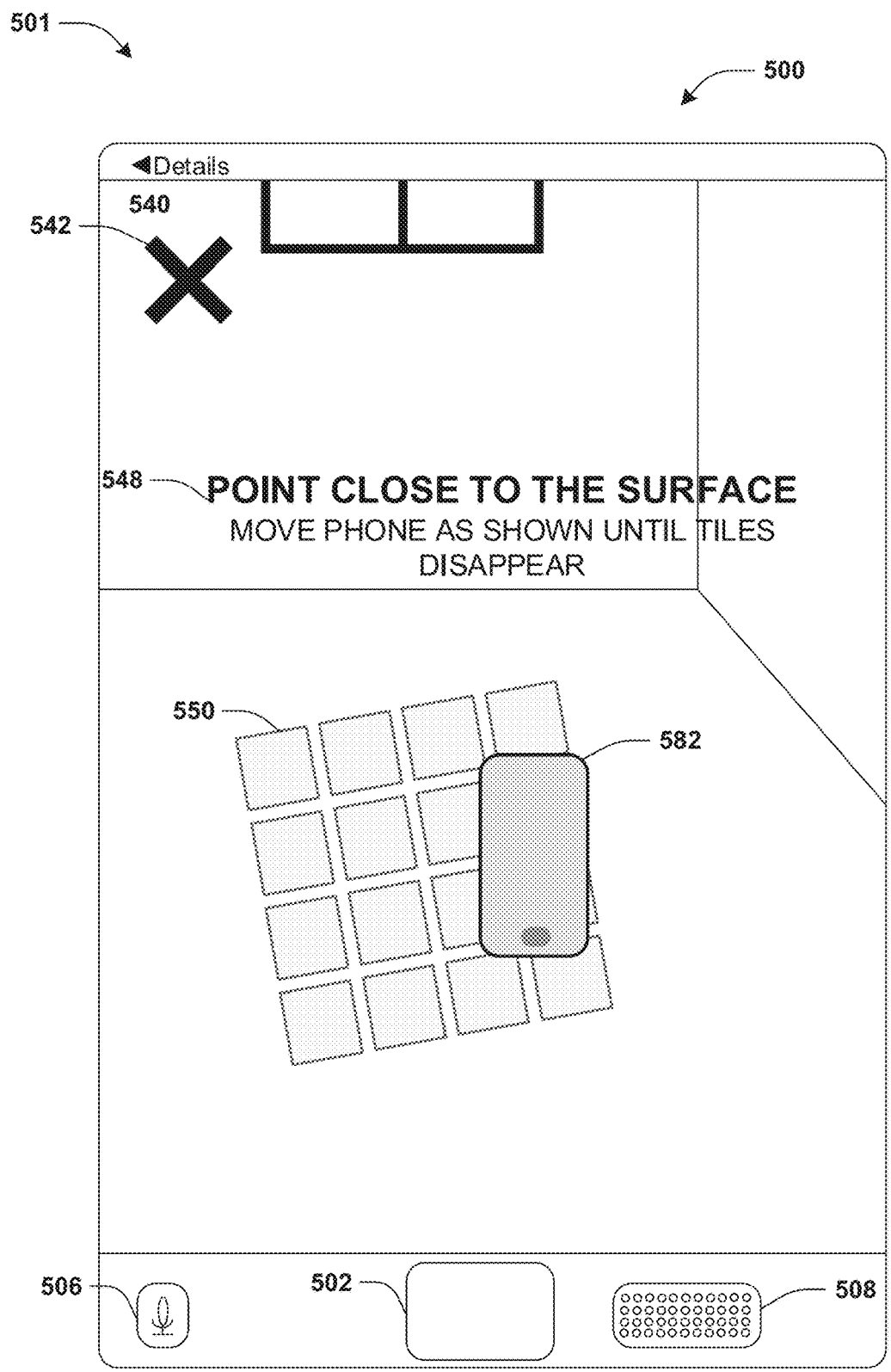
FIG. 5F is a component block diagram illustrating an example system for presenting an AR interface, where a fourth instruction, a second graphic and a third graphic are presented.
Figure 5G:
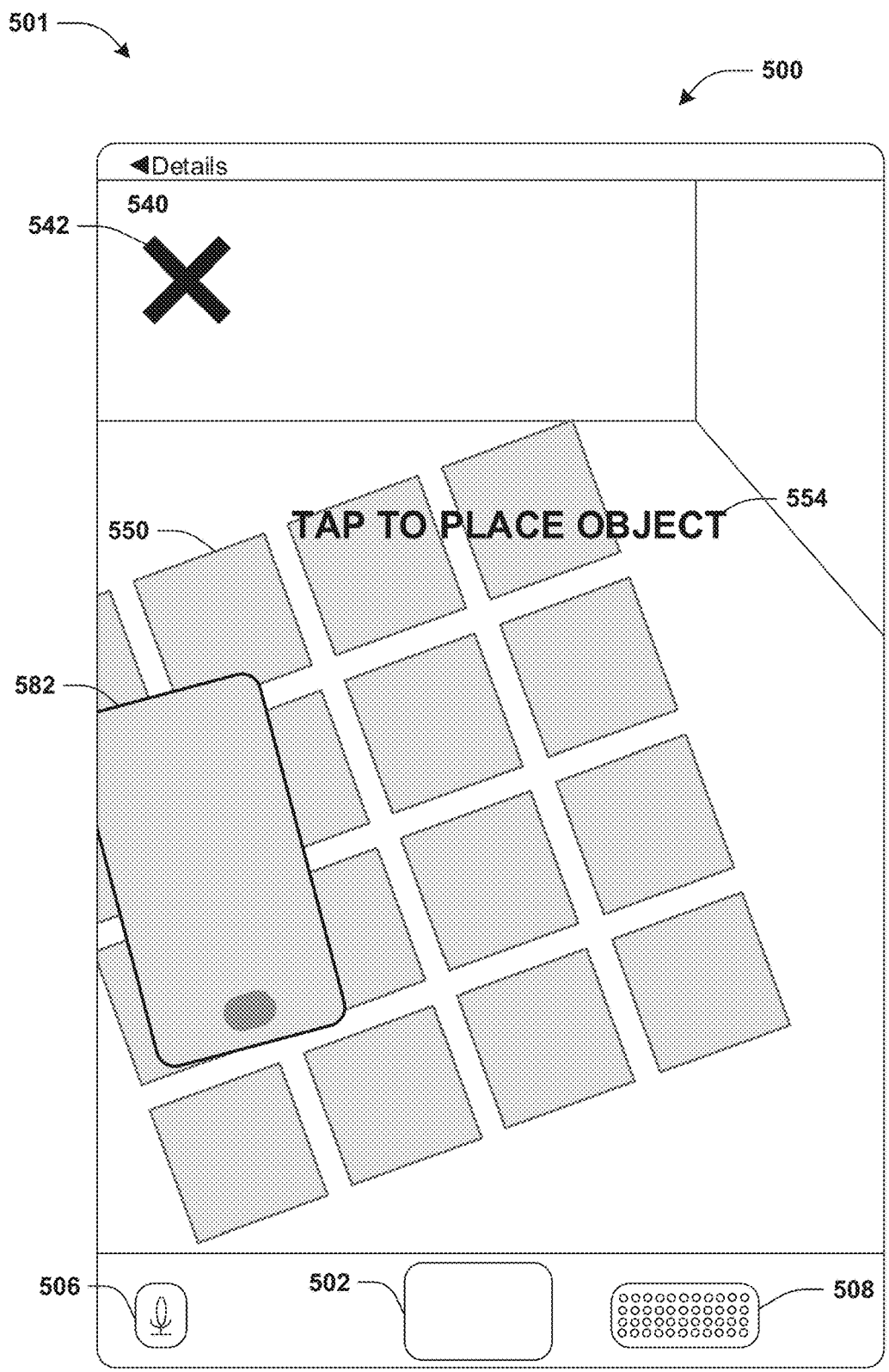
FIG. 5G is a component block diagram illustrating an example system for presenting an AR interface, where a fifth instruction is presented and a second graphic and a third graphic change into a different representation of the second graphic and the third graphic.
Figure 5H:
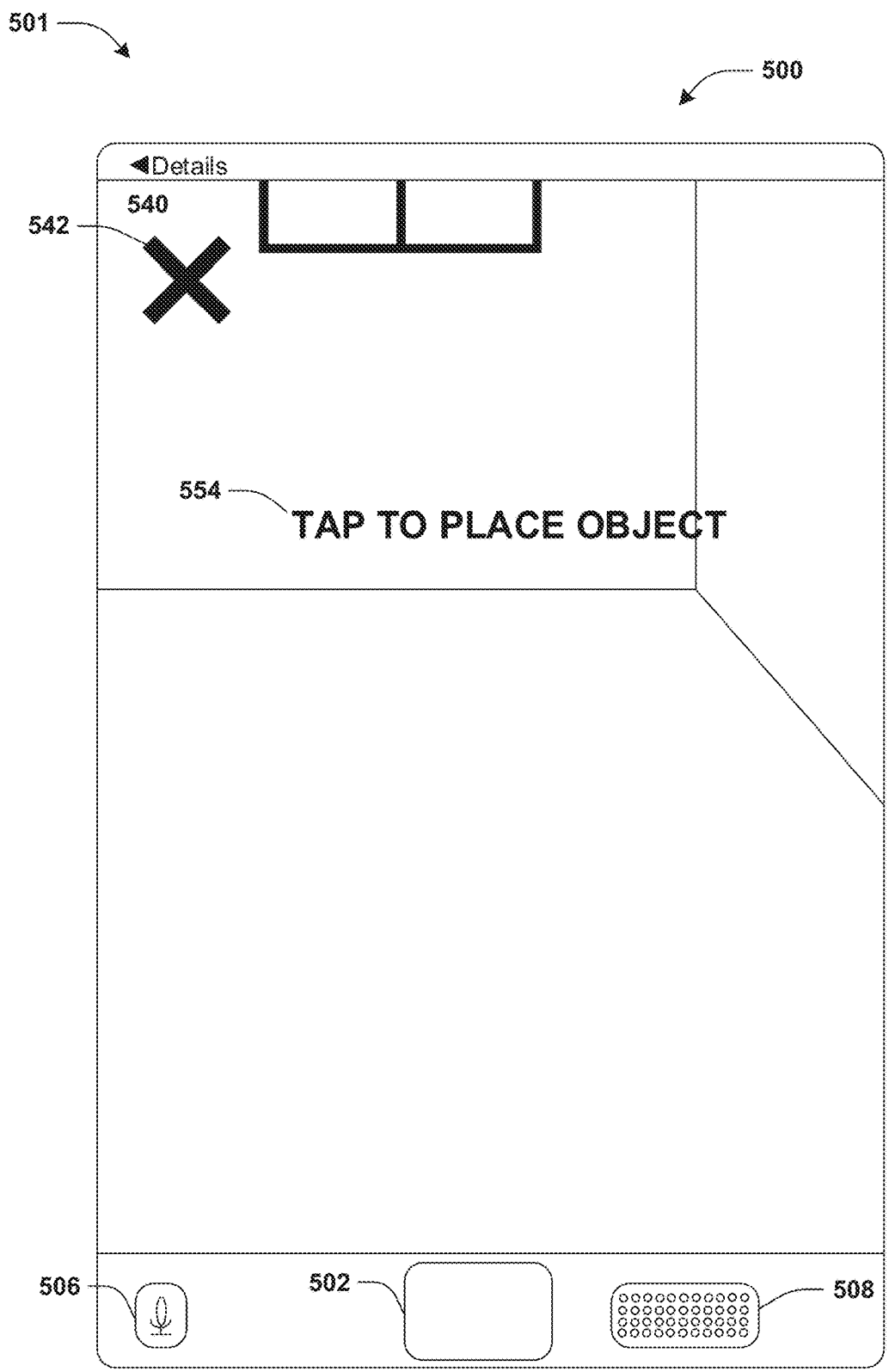
FIG. 5H is a component block diagram illustrating an example system for presenting an AR interface, where a fifth instruction is presented.
Figure 5I:
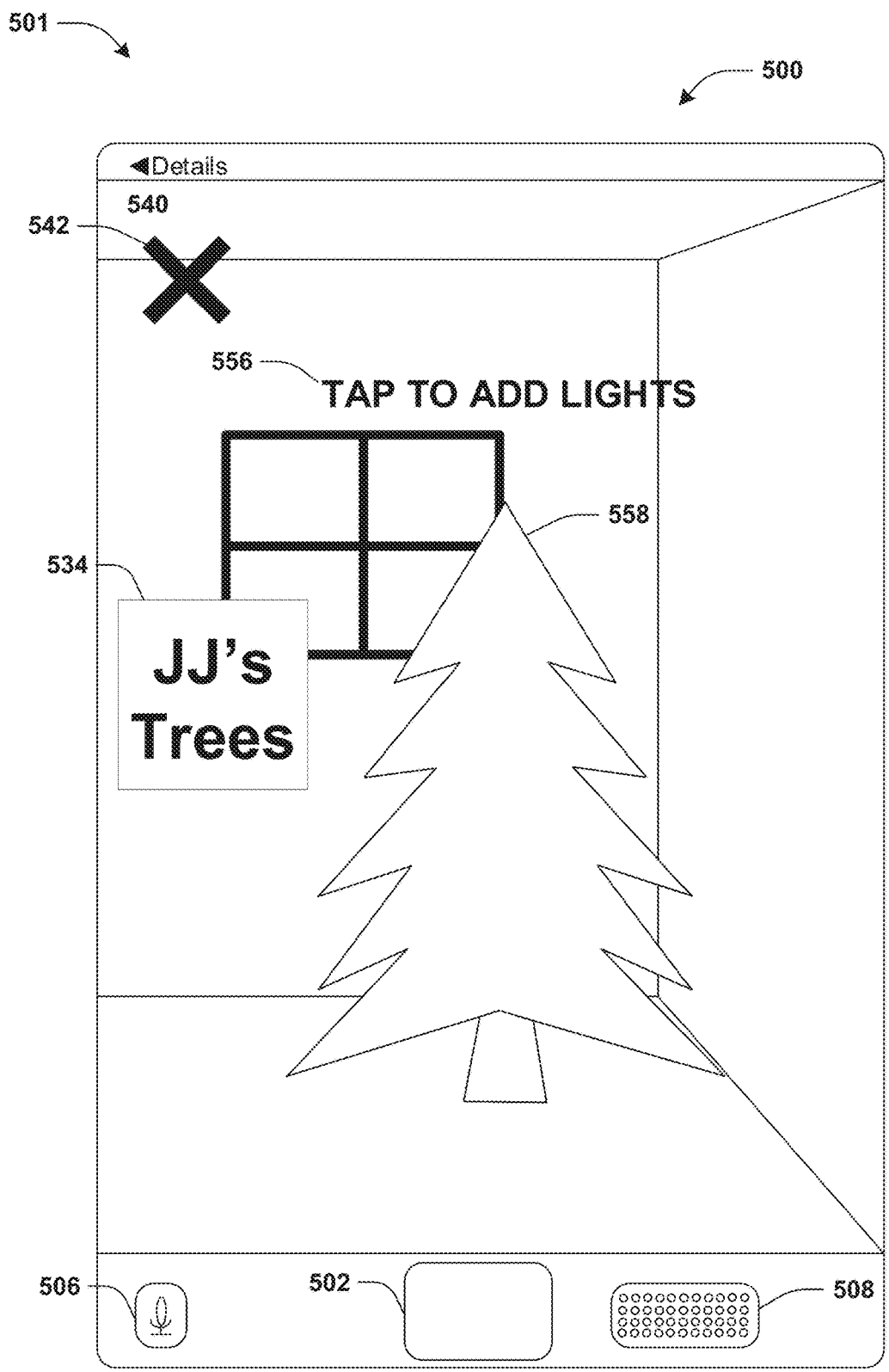
FIG. 5I is a component block diagram illustrating an example system for presenting an AR interface, where a sixth instruction, a logo and a first graphical representation of a first graphical object are presented.
Figure 5J:
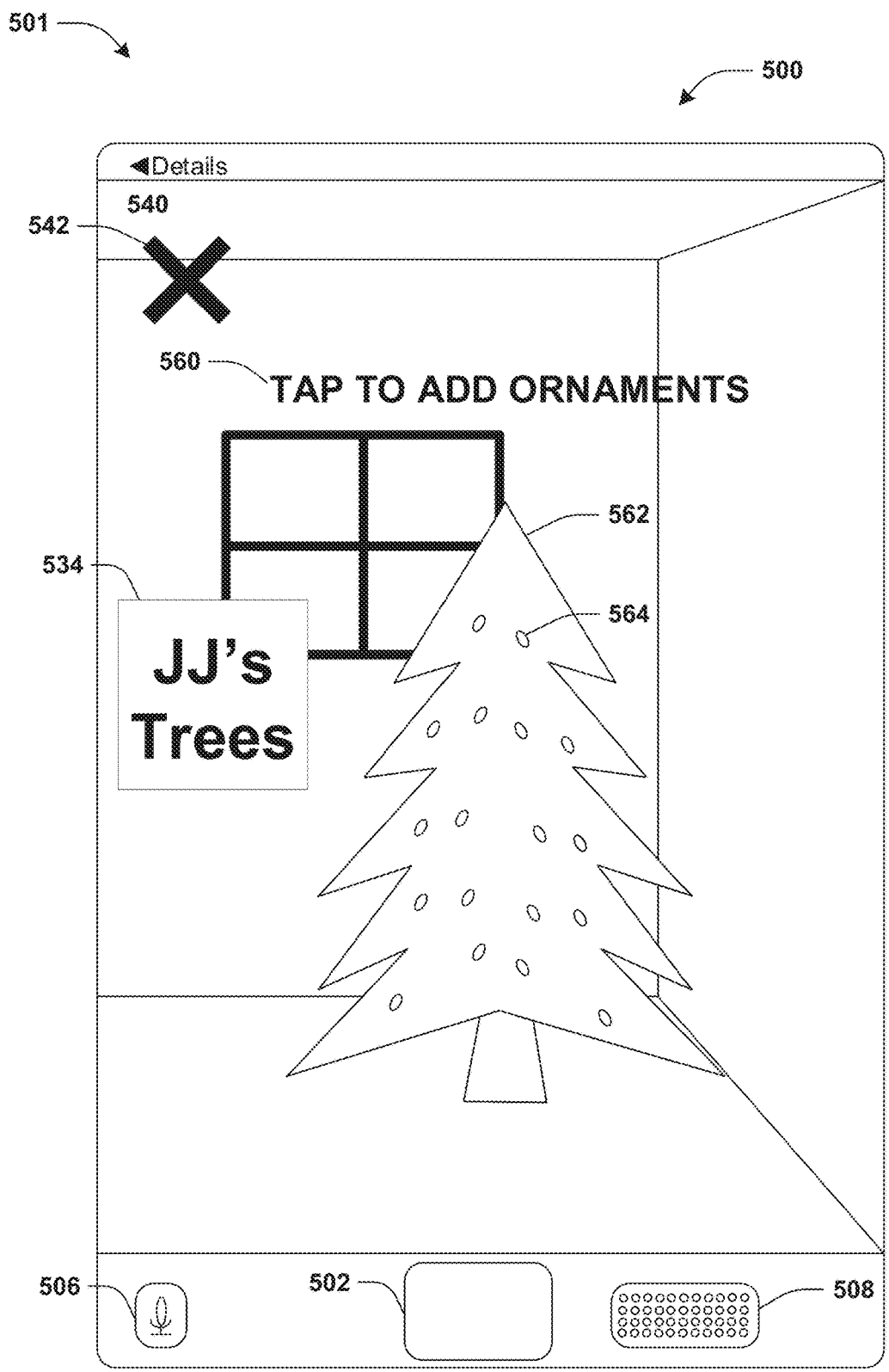
FIG. 5J is a component block diagram illustrating an example system for presenting an AR interface, where a seventh instruction, a logo and a second graphical representation of a first graphical object are presented.
Figure 5K:
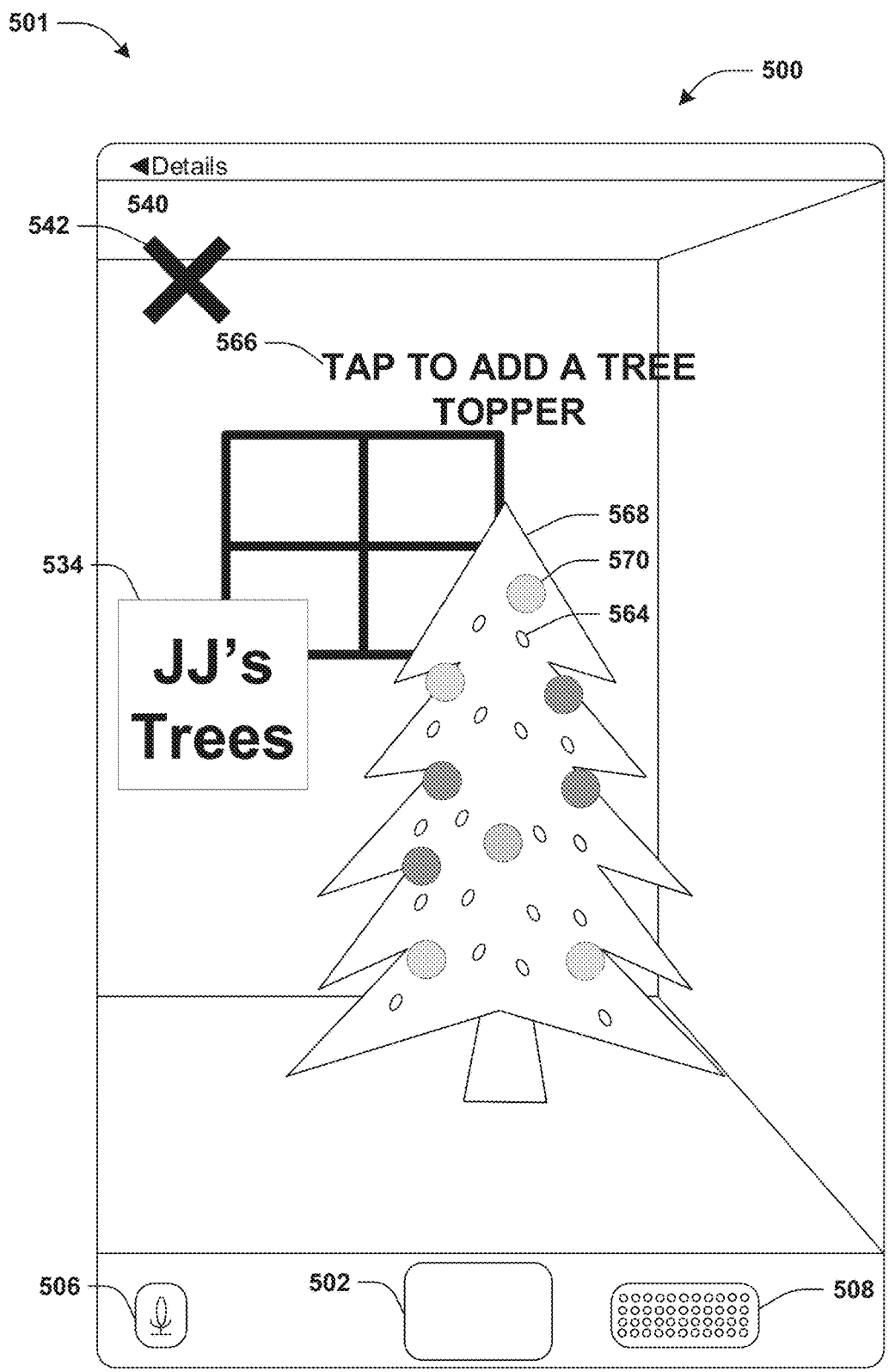
FIG. 5K is a component block diagram illustrating an example system for presenting an AR interface, where an eighth instruction, a logo and a third graphical representation of a first graphical object are presented.
Figure 5L:
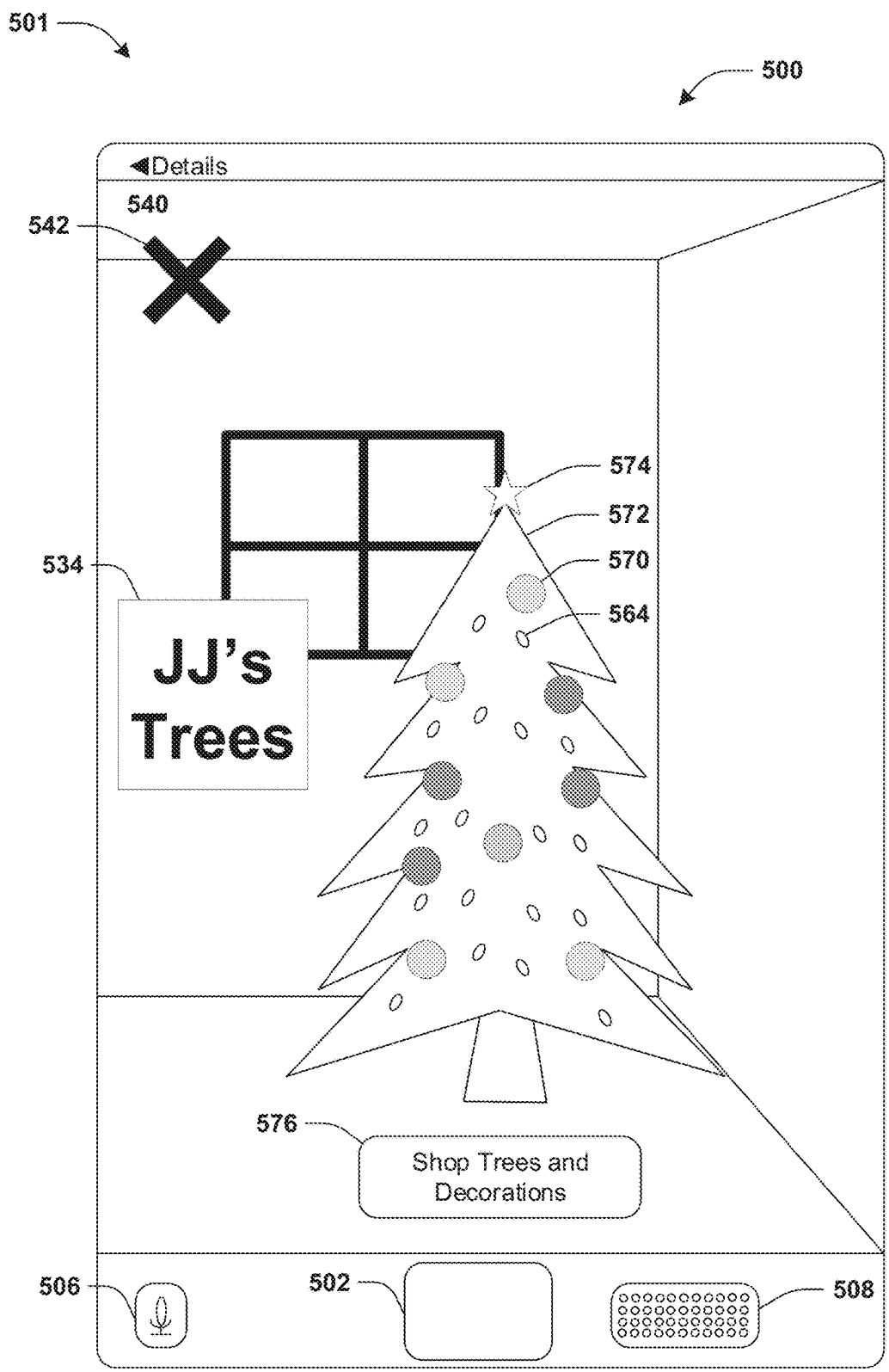
FIG. 5L is a component block diagram illustrating an example system for presenting an AR interface, where a logo, a second graphical object and a fourth graphical representation of a first graphical object are presented.
Figure 5M:
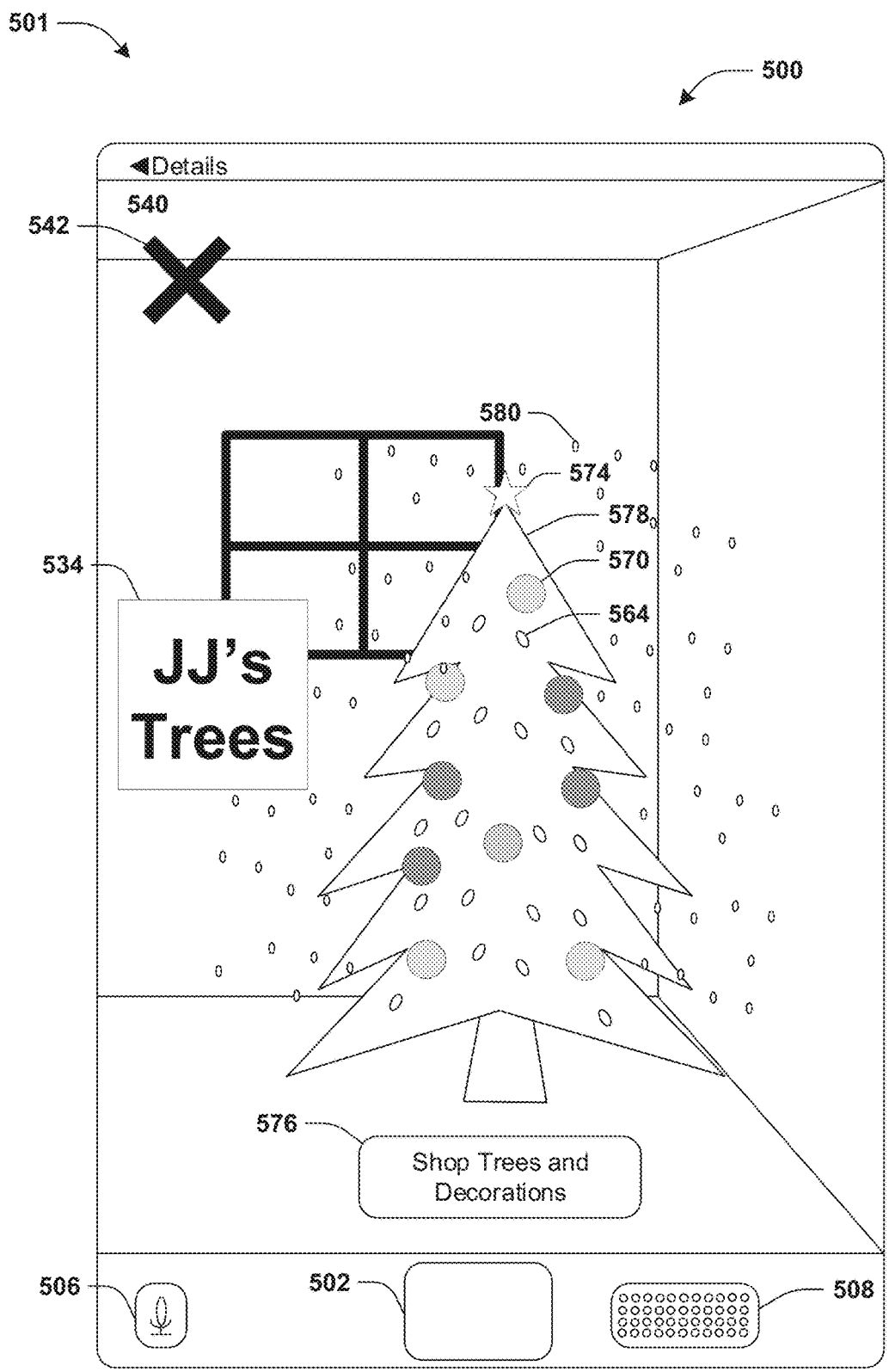
FIG. 5M is a component block diagram illustrating an example system for presenting an AR interface, where a logo, a second graphical object and a fifth graphical representation of a first graphical object are presented.
Figure 5N:
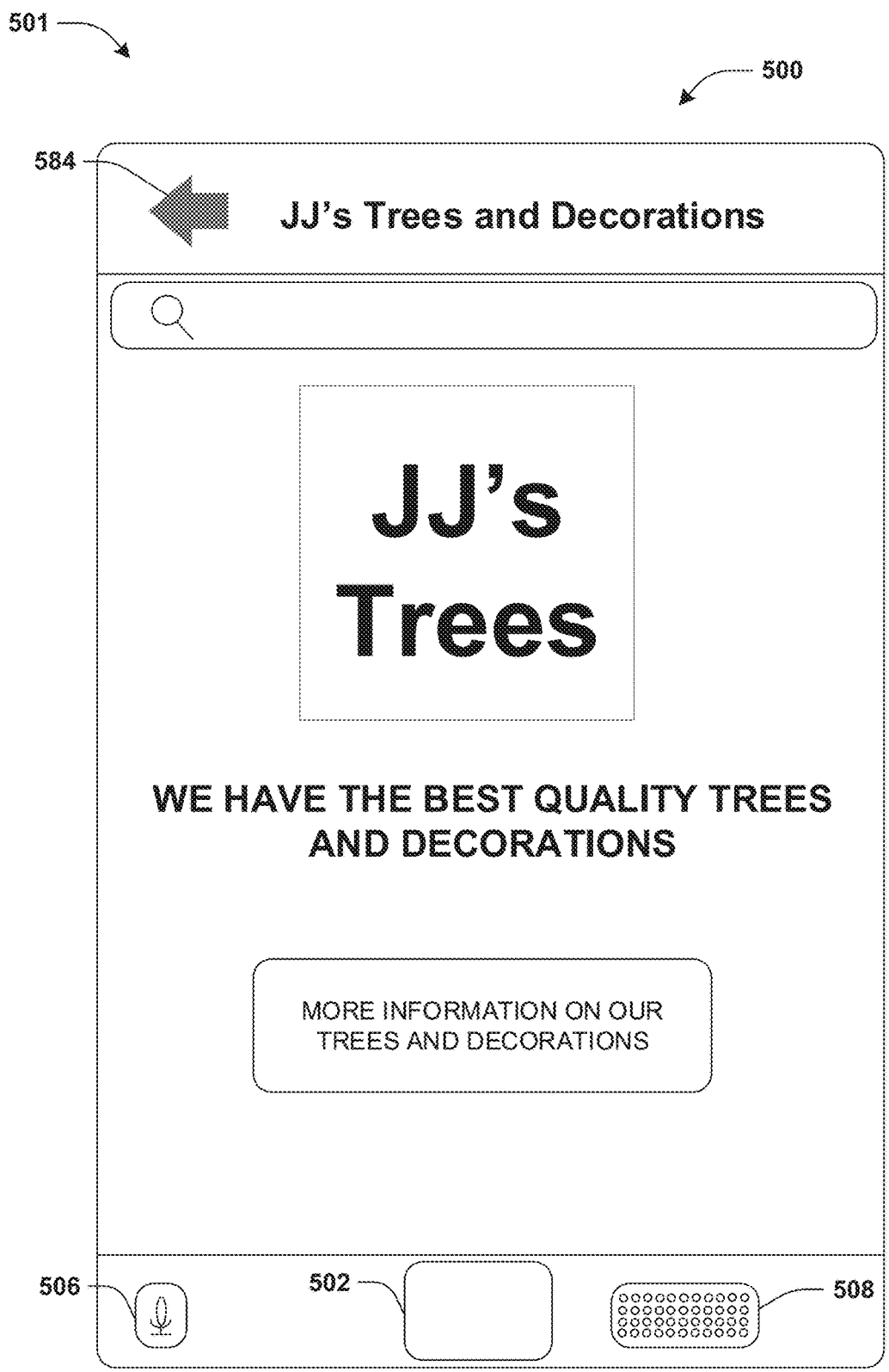
FIG. 5N is a component block diagram illustrating an example system for presenting an AR interface, where information is presented responsive to receiving a selection of a second graphical object.

FIGS. 5A-5N illustrate examples of a system 501 for presenting an AR interface. A user, such as user James, may access and/or interact with an application, such as an instant messaging application, an email application, a social network application, a web-browser application etc., on a device 500 of the user.

FIG. 5A illustrates the device 500 presenting an application comprising a list of items. The application may comprise an email application and the list of items may comprise a list of emails in an inbox of an email account of the user. The device 500 may comprise a button 502, a microphone 506 and/or a speaker 508. The application may comprise a search area that may be used to search the email account.

The list of items may comprise a first item 520, a second item 522, a third item 524 and/or a fourth item 526. A first object 510 corresponding to a representation of content in an AR interface may be presented within the list of items (e.g., above the list of items). The first object 510 may comprise a title 514 (e.g., "JJ's Trees"), a first image 512, a description 516 (e.g., "Watch a decorative tree come to life through your phone's camera") and/or a second image 518 (e.g., comprising a cube) representing the AR interface.

FIG. 5B illustrates an animation 528 being presented responsive to receiving one or more user inputs. The one or more user inputs may comprise scrolling through the list of items. In some examples, the second image 518 may be replaced by the animation 528 responsive to the one or more inputs. In some examples, a speed of the animation 528 may be based upon a speed of the scrolling through the list of items. The animation 528 may represent the cube of the second image 518 changing (e.g., morphing) into a different representation of the cube (e.g., a different color, a different size, a different theme, etc.) and/or the animation 528 may represent the cube moving (e.g., rotating, spinning, moving in different directions, etc.). In some examples, the first object 510 may be selected.

FIG. 5C illustrates a first graphical object 532 being presented responsive to receiving the selection of the first object 510. In some examples, the first object 510 may be a 3-dimensional and/or a 2-dimensional representation of a tree. In some examples, a logo 534 associated with the content (e.g., and/or a company and/or an organization promoting the content) may be presented adjacent to (e.g., next to) the first graphical object 532. In some examples, the logo 534 may be linked to information corresponding to the content (e.g., and/or a website comprising the information). Accordingly, responsive to receiving a selection of the logo 534, the information may be presented (e.g., via the website). A first instruction 530 (e.g., comprising "Virtually place and see this object in your room") may be presented adjacent to (e.g., above) the first graphical object 532. In some examples, a second object 536 (e.g., representing a button "Place Object") and/or a third object 538 (e.g., representing a button "Close") may be presented adjacent to (e.g., below) the first graphical object 532. In some examples, responsive to receiving a selection of the third object 538, the list of items may be presented. Responsive to receiving a selection of the second object 536, an AR interface may be presented.

FIG. 5D illustrates the AR interface comprising a real time view 540 of a camera of the device 500 being presented. In some examples, the AR interface may comprise a fourth object 542 (e.g., comprising a button shaped as "x"). Responsive to receiving a selection of the fourth object 542, the list of items may be presented (e.g., and/or the AR interface may be closed). In some examples, the AR interface may comprise a second instruction 544 (e.g., comprising "Initializing, HOLD CAMERA STEADILY") corresponding to a first step (e.g., initializing the AR interface) of one or more steps necessary to implementing the AR interface. Upon completion of the first step, a second step (e.g., a first part of detecting a plane and/or mapping a surface) may begin.

FIG. 5E illustrates a third instruction 546 (e.g., comprising "DETECTING SURFACE, MOVE PHONE SLOWLY") and a first graphic 552 being presented to perform the second step. In some examples, the first graphic 552 may comprise a representation of a phone moving in one or more directions to assist the user in performing the third instruction 546. Upon completion of the second step, a third step (e.g., a second part of detecting the plane and/or mapping the surface) may begin.

FIG. 5F illustrates a fourth instruction 548 (e.g., comprising "POINT CLOSE TO THE SURFACE, MOVE PHONE AS SHOWN UNTIL TILES DISAPPEAR"), a second graphic 582 and a third graphic 550 being presented to perform the third step. In some examples, the second graphic 582 may comprise a second representation of a phone moving in one or more directions and the third graphic 550 may comprise a set of tiles overlaid onto the plane and/or the surface to assist the user in performing the fourth instruction 548. Upon completion of the third step, the fourth instruction 548 may be removed.

FIG. 5G illustrates a fifth instruction 554 being presented and the second graphic 582 and the third graphic 550 changing into a different representation of the second graphic 582 and the third graphic 550 (e.g., the second graphic 582 and the third graphic 550 may change size, the second graphic 582 and the third graphic 550 may change color, etc.) upon completion of the third step.

FIG. 5H illustrates the fifth instruction 554 (e.g., comprising "TAP TO PLACE OBJECT)" being presented (e.g., overlaid onto the real time view 540). In some examples, a location within the real time view 540 for inserting the first graphical object 532 and/or a representation of the first graphical object 532 may be selected. In some examples, the selection of the location may correspond to a positioning of the device 500, the real time view 540 and/or a positioning of a user input (e.g., comprising pressing on a touchscreen of the device 500) relative to the real time view 540. In an example where the real time view 540 comprises a part of a room and the user input is positioned at a region corresponding to a first point (e.g., on a floor, on a wall, on a ceiling, etc.) of the room, the first point may be selected as the location (e.g., for inserting the first graphical object 532).

FIG. 5I illustrates a sixth instruction 556 (e.g., comprising "TAP TO ADD LIGHTS"), the logo 534 and a first graphical representation 558 of the first graphical object 532 being presented (e.g., overlaid onto the real time view 540). The first graphical representation 558 may correspond to a first part of a storyline associated with the content. The first part of the storyline may correspond to a representation of an undecorated version of the tree. The sixth instruction 556 may guide the user to a second part of the storyline.

In some examples, the first graphical representation 558 may be presented in a manner that makes it appear to be behind and/or in front of one or more physical objects presented in the real time view 540. For example, a first physical object may be presented in a manner that appears to be in front of the first graphical representation 558 (e.g., such that one or more portions of the first graphical representation 558 are blocked from view by one or more portions of the first physical object). Alternatively and/or additionally, a second physical object may be displayed in a manner that appears to be behind the first graphical representation 558 (e.g., such that one or more portions of the second physical object are blocked from view by one or more portions of the first graphical representation 558). The first physical object and/or the second physical object may be animate (e.g., a person walking, a car moving, etc.) and/or may be inanimate (e.g., furniture, a window, etc.).

FIG. 5J illustrates a seventh instruction 560 (e.g., comprising "TAP TO ADD ORNAMENTS"), the logo 534 and a second graphical representation 562 of the first graphical object 532 being presented (e.g., overlaid onto the real time view 540). The second graphical representation 562 comprising a first layer of decorations 564 (e.g., lights) may correspond to a graphical modification of the first graphical representation 558 and to the second part of the storyline (e.g., a representation of the tree comprising the first layer of decorations 564). The seventh instruction 560 may guide the user to a third part of the storyline.

FIG. 5K illustrates an eighth instruction 566 (e.g., comprising "TAP TO ADD A TREE TOPPER"), the logo 534 and a third graphical representation 568 of the first graphical object 532 being presented (e.g., overlaid onto the real time view 540). The third graphical representation 568 comprising a second layer of decorations 570 (e.g., ornaments) may correspond to a graphical modification of the second graphical representation 562 and to the third part of the storyline (e.g., a representation of the tree comprising the first layer of decorations 564 and the second layer of decorations 570). The eighth instruction 566 may guide the user to a fourth part of the storyline.

FIG. 5L illustrates the logo 534, a second graphical object 576 and a fourth graphical representation 572 of the first graphical object 532 being presented (e.g., overlaid onto the real time view 540). The fourth graphical representation 572 comprising a third layer of decorations 574 (e.g., a tree topper) may correspond to a graphical modification of the third graphical representation 568 and to the fourth part of the storyline (e.g., a representation of the tree comprising the first layer of decorations 564, the second layer of decorations 570 and the third layer of decorations 574). In some examples, the second graphical object 576 may be presented upon completion of the third part of the storyline. In some examples, the second graphical object 576 may be linked to the information (e.g., and/or second information) corresponding to the content and/or the website comprising the information (e.g., and/or a second website comprising the second information).

FIG. 5M illustrates the logo 534, the second graphical object 576 and a fifth graphical representation 578 of the first graphical object 532 being presented (e.g., overlaid onto the real time view 540). The fifth graphical representation 578 comprising an animation 580 (e.g., comprising a representation of snow falling around the tree) may correspond to a graphical modification of the fourth graphical representation 572 and to a fifth part of the storyline (e.g., a representation of the tree comprising the first layer of decorations 564, the second layer of decorations 570, the third layer of decorations 574 and the animation 580). In some examples, responsive to receiving a selection of the second graphical object 576, the information (e.g., and/or the second information) may be presented.

FIG. 5N illustrates the information (e.g., corresponding to the content) being presented responsive to receiving the selection of the second graphical object 576. In some examples, the information may be comprised within the website. In some examples, a fifth object 584 (e.g., representing a button shaped as a backwards arrow, representing a button "Close" and/or representing a button "Done") may be presented. In some examples, responsive to receiving a selection of the fifth object 584, the list of items may be presented.

It may be appreciated that the disclosed subject matter may assist a user (e.g., and/or a device associated with the user) in viewing, interacting with, determining a significance of and/or developing an understanding of content presented to the user in an application via an AR interface corresponding to the content that may be accessed using the application.

Implementation of at least some of the disclosed subject matter may lead to benefits including, but not limited to, a reduction in screen space and/or an improved usability of a display (e.g., of the device) (e.g., as a result of presenting the content using the application and presenting the AR interface using the application responsive to receiving a request to access the AR interface without a need for the user to open and/or install a separate application, as a result of determining one or more parameters of the device and determining one or more resolutions and/or one or more polygon counts corresponding to the AR interface based upon the one or more parameters of the device, as a result of changing one or more parts of the AR interface based upon one or more metrics associated with the AR interface, etc.). Alternatively and/or additionally, implementation of at least some of the disclosed subject matter may lead to benefits including a reduction in power consumption (e.g., as a result of the user spending less time interacting with, viewing, determining a significance of and/or developing an understanding of the content, as a result of providing a more efficient interface for interacting with, viewing, determining a significance of and/or developing an understanding of the content, as a result of a reduction of transmission and/or reception of data, as a result of presenting the content using the application and presenting the AR interface using the application responsive to receiving the request to access the AR interface without a need for the user to open and/or install a separate application, etc.). Alternatively and/or additionally, implementation of at least some of the disclosed subject matter may lead to benefits including a reduction in bandwidth (e.g., as a result of determining one or more parameters of the network and determining one or more resolutions and/or one or more polygon counts corresponding to the AR interface based upon the one or more parameters of the network, as a result of presenting the content using the application and presenting the AR interface using the application responsive to receiving the request to access the AR interface without a need for the user to open and/or install a separate application, etc.). Alternatively and/or additionally, implementation of at least some of the disclosed subject matter may lead to benefits including an increase in speed and usability of the client device (e.g., as a result of fewer operations performed by a computer without providing a separate application for the user to access the AR interface, as a result of determining one or more parameters of the device comprising a processing power, memory parameters and/or an operating system of the device and determining one or more resolutions and/or one or more polygon counts corresponding to the AR interface based upon the one or more parameters of the device, etc.).

It may be appreciated that at least some of the disclosed subject matter can be provided as a Software Development Kit (SDK) so that a developer of an application merely has to decide where to show a message list content component, and customize it if they desire. The rest of the experience is provided by the SDK and may not require and/or may reduce a requirement for new development as long as the SDK is included with the application when it is compiled by the developer and installed by the user.

It may further be appreciated that in some embodiments, the application may use a (e.g., single) content controller to request content from a content source, and thus a server may have (e.g., full) control on what content to present. Such an approach may be limited in effectiveness due to the greater amount of resource consumption associated with content associated with AR, when compared to non-AR content. This increase in resource consumption may further be associated with a delay and/or lag in presenting the content associated with AR. Thus, an (e.g., additional) content controller may be provided to request content associated with AR. Logic may be provided to coordinate (e.g., rotate, present one when the other is not available, etc.) between content associated with AR and non-AR content, and a resource manager may download and/or cache the content associated with AR. In some examples, the (e.g., additional) content controller may support various types of content associated with AR. The logic may be configured to share common resources between the non-AR content and/or the content associated with AR and/or various contents associated with AR, and/or may be configured to manage and/or present content associated with AR with a plurality of (e.g., SCN) files that position the locations of sounds within audio files and/or arrays of assets.

In some examples, at least some of the disclosed subject matter may be implemented on a client device, and in some examples, at least some of the disclosed subject matter may be implemented on a server (e.g., hosting a service accessible via a network, such as the Internet).

Figure 6:
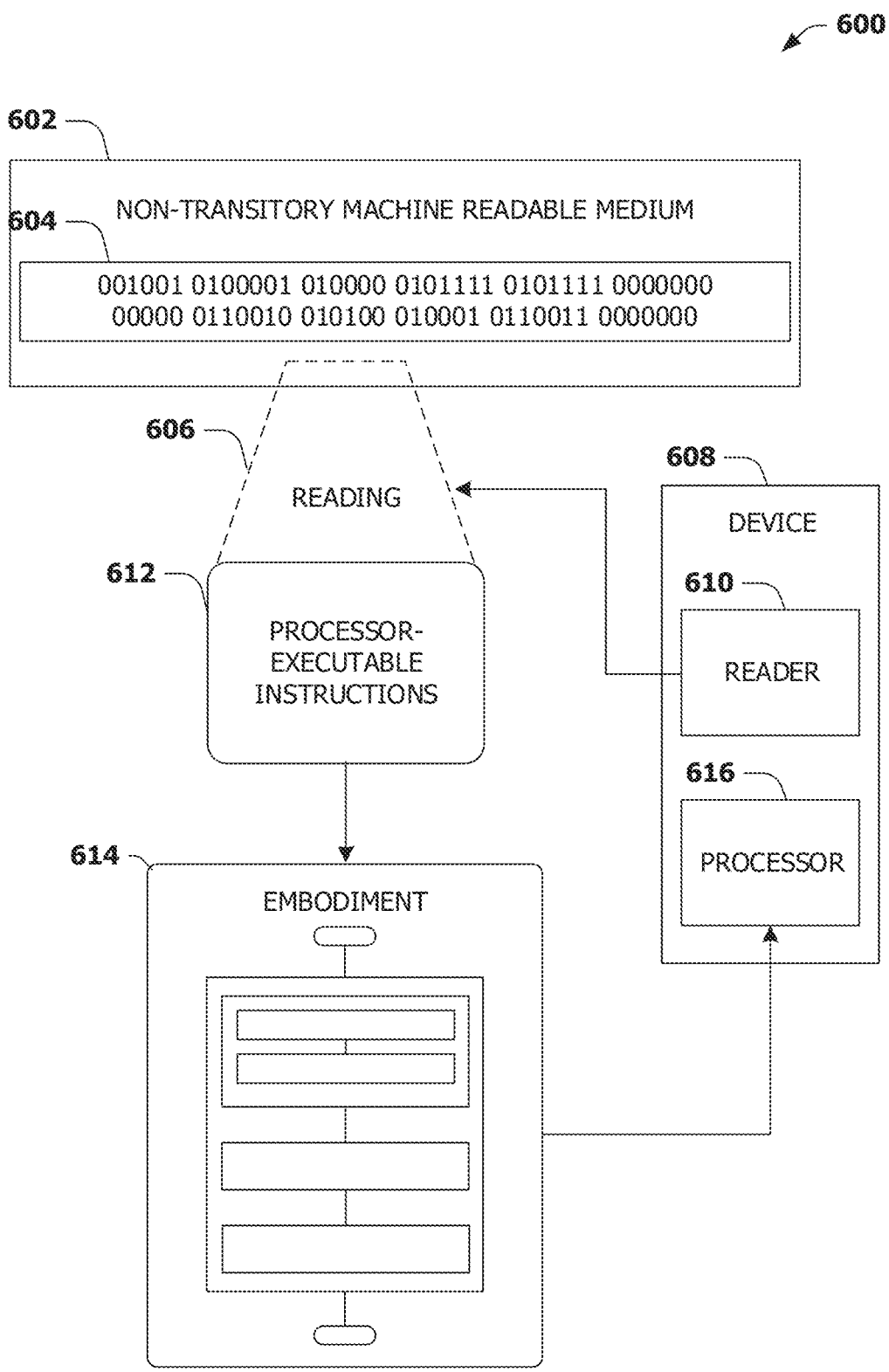
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIGS. 4A-4B, for example. In some embodiments, the processor-executable instructions 612 are configured to cause implementation of a system, such as at least some of the example system 501 of FIGS. 5A-5N, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   determining at least one of:
   a parameter of a device corresponding to at least one of processing power of the device, an operating system of the device, a memory parameter of the device, or a lighting of surroundings of the device; or
   a parameter of a network to which the device is connected;
   determining at least one of one or more resolutions or one or more polygon counts based upon at least one of the parameter of the device or the parameter of the network;
   presenting a first graphical object corresponding to content;
   responsive to receiving a request to overlay the first graphical object onto a live display of an area, presenting an augmented reality interface comprising a real time view of a camera of the device; and
   responsive to receiving a request to insert a representation of the first graphical object into the real time view of the camera, presenting a first graphical representation of the first graphical object overlaid on the real time view of the camera of the device, at least one of the first graphical object or the first graphical representation generated based upon at least one of the one or more resolutions or the one or more polygon counts.

2. The method of claim 1, comprising:
   modifying a first perspective of the first graphical representation to a second perspective of the first graphical representation responsive to at least one of a first change of the real time view of the camera or a first user input.

3. The method of claim 1, comprising:
   outputting audio corresponding to the content using a speaker during at least one of the presenting the first graphical object, the presenting the augmented reality interface or the presenting the first graphical representation, the audio comprising at least one of music, one or more sound effects, one or more instructions or second information.

4. The method of claim 1, comprising:
   responsive to receiving a request to record a video, recording the video of at least one of a portion of the first graphical representation overlaid on the real time view of the camera of the device.

5. The method of claim 4, comprising:
   responsive to receiving a selection of a second device as a sharing recipient via a sharing interface, transmitting the video to the second device.

6. The method of claim 1, comprising:
   responsive to receiving a selection of a second device as a sharing recipient via a sharing interface, transmitting a link to the second device for accessing the content in the augmented reality interface using an application of the device.

7. The method of claim 1, comprising:
   presenting a logo associated with the content during at least one of the presenting the first graphical object, the presenting the augmented reality interface or the presenting the first graphical representation.

8. The method of claim 1, wherein the determining at least one of the one or more resolutions or the one or more polygon counts is based upon the parameter of the device, wherein the parameter of the device corresponds to the processing power of the device.

9. The method of claim 1, wherein the determining at least one of the one or more resolutions or the one or more polygon counts is based upon the parameter of the device, wherein the parameter of the device corresponds to the operating system of the device.

10. The method of claim 1, wherein the determining at least one of the one or more resolutions or the one or more polygon counts is based upon the parameter of the device, wherein the parameter of the device corresponds to the memory parameter of the device.

11. The method of claim 1, wherein the determining at least one of the one or more resolutions or the one or more polygon counts is based upon the parameter of the device, wherein the parameter of the device corresponds to the lighting of surroundings of the device.

12. The method of claim 1, wherein the determining at least one of the one or more resolutions or the one or more polygon counts is based upon the parameter of the network to which the device is connected.

13. The method of claim 1, comprising:
responsive to receiving a request to capture an image, capturing the image of a first instance of the first graphical representation overlaid on the real time view of the camera of the device.

14. The method of claim 13, comprising:
responsive to receiving a selection of a second device as a sharing recipient via a sharing interface, transmitting the image to the second device.

15. A computing device comprising:
a processor; and
memory comprising processor-executable instructions that when executed by the processor cause performance of operations, the operations comprising:
determining at least one of:
a parameter of a device corresponding to at least one of processing power of the device, an operating system of the device, a memory parameter of the device, or a lighting of surroundings of the device; or
a parameter of a network to which the device is connected;
determining at least one of one or more resolutions or one or more polygon counts based upon at least one of the parameter of the device or the parameter of the network;
presenting a first graphical object corresponding to content;
responsive to receiving a request to overlay the first graphical object onto a live display of an area, presenting an augmented reality interface comprising a real time view of a camera of the device; and
responsive to receiving a request to insert a representation of the first graphical object into the real time view of the camera, presenting a first graphical representation of the first graphical object overlaid on the real time view of the camera of the device, at least one of the first graphical object or the first graphical representation generated based upon at least one of the one or more resolutions or the one or more polygon counts.

16. The computing device of claim 15, the operations comprising:
modifying a first perspective of the first graphical representation to a second perspective of the first graphical representation responsive to at least one of a first change of the real time view of the camera or a first user input.

17. The computing device of claim 15, the operations comprising:
outputting audio corresponding to the content using a speaker during at least one of the presenting the first graphical object, the presenting the augmented reality interface or the presenting the first graphical representation, the audio comprising at least one of music, one or more sound effects, one or more instructions or second information.

18. A non-transitory machine readable medium having stored thereon processor-executable instructions that when executed cause performance of operations, the operations comprising:
presenting a list of items in an application of a device;
presenting, within the list of items, a first object corresponding to a representation of content in an augmented reality interface;
responsive to receiving a selection of the first object, presenting a first graphical object corresponding to the content;
responsive to receiving a request to overlay the first graphical object onto a live display of an area, presenting an augmented reality interface comprising a real time view of a camera of the device;
responsive to receiving a request to insert a representation of the first graphical object into the real time view of the camera, presenting a first graphical representation of the first graphical object overlaid on the real time view of the camera of the device;
responsive to receiving a request to supplement the first graphical representation with a graphical modification, presenting a second graphical representation of the first graphical object, comprising the graphical modification, overlaid on the real time view of the camera of the device;
presenting a third graphical representation of the first graphical object comprising the graphical modification and a second graphical object associated with information corresponding to the content; and
responsive to receiving a selection of the second graphical object, presenting the information.

19. The non-transitory machine readable medium of claim 18, the operations comprising:
presenting a second image in the first object.

20. The non-transitory machine readable medium of claim 19, the operations comprising:
responsive to receiving one or more user inputs in the application, replacing the second image with an animation.

* * * * *